United States Patent [19]
Machida

[11] Patent Number: 5,603,023
[45] Date of Patent: Feb. 11, 1997

[54] PROCESSOR CIRCUIT FOR HEAPSORTING

[75] Inventor: Hirohisa Machida, Hyogo, Japan

[73] Assignee: Mitsubishi Denki Kabushiki Kaisha, Tokyo, Japan

[21] Appl. No.: 557,503

[22] Filed: Nov. 14, 1995

Related U.S. Application Data

[63] Continuation of Ser. No. 327,828, Oct. 24, 1994, abandoned.

[30] Foreign Application Priority Data

Nov. 1, 1993 [JP] Japan .................................. 5-273892

[51] Int. Cl.[6] .................................................... G06F 7/24
[52] U.S. Cl. ................... 395/607; 395/800; 364/DIG. 1; 364/222.9; 364/DIG. 2
[58] Field of Search .................................. 395/600, 650, 395/800

[56] References Cited

U.S. PATENT DOCUMENTS

| | | | |
|---|---|---|---|
| 5,185,888 | 2/1993 | Tanaka et al. | 395/600 |
| 5,206,947 | 4/1993 | Edem et al. | 395/600 |
| 5,511,189 | 4/1996 | Machida | 395/600 |
| 5,530,883 | 6/1996 | Baum et al. | 395/800 |
| 5,535,384 | 7/1996 | Kasahara | 395/600 |

OTHER PUBLICATIONS

"Recent Research and Development of Database Processor", Masaru Kitsuregawa, Joho–Shori, vol. 33, pp. 1388–1402, 1992.

Structured Computer Organization Prentice–Hall, Inc., 1984, Andrew S. TanenBaum, pp. 10–12.

Pascal Plus Data Structures, Algorithms and Advanced Programming, Dale et al, D. C. Heath & Co., 1988 pp. 476–491, 534–541.

Pipeline Searching and Sorting Modules as Components of a Dataflow Database Computer, IFIP,80, pp. 427–432, North Holland Publishing Company, NY.

Primary Examiner—Larry D. Donaghue
Attorney, Agent, or Firm—Lowe, Price, LeBlanc & Becker

[57] ABSTRACT

A heapsort processor includes a first decoder for selecting a parent macro cell and a second decoder for selecting macro cell pair 480 having twice or twice plus one the address of the parent. The data of the parent is read to the first bit line, while data of a macro cell storing larger data in macro cell pair is read to the second bit line. The processor further includes a circuit for exchanging, when the data on the second bit line is larger than the data on the first bit line, the data of these bit lines and for writing the exchanged data to original macro cells. This enables generation of heap data. When a macro cell storing a root is selected by disabling the second decoder, part of a heapsort algorithm can be implemented in a hardware.

16 Claims, 29 Drawing Sheets

FIG.20

| Ext. ADDRESS | | | SELECTED WORD VALUE OF DECODE CKT 60 | SELECTED WORD VALUE OF DECODE CKT 62 |
|---|---|---|---|---|
| DECIMAL NUMBER | BINARY NUMBER <2> <1> <0> | | | |
| 0 | 0 0 | 0 | 0 | 2, 3 |
| 1 | 0 0 | 1 | 1 | 4, 5 |
| 2 | 0 1 | 0 | 2 | 6, 7 |
| 3 | 0 1 | 1 | 3 | 8, 9 |
| 4 | 1 0 | 0 | 4 | 10, 11 |
| 5 | 1 0 | 1 | 5 | 12, 13 |
| 6 | 1 1 | 0 | 6 | 14, 15 |
| 7 | 1 1 | 1 | 7 | |

FIG.26

| PREVIOUS DATA BINARY NUMBER (DECIMAL NUMBER) | 1/2 OF PREVIOUS DATA BINARY NUMBER (DECIMAL NUMBER) | PRESENT DATA BINARY NUMBER (DECIMAL NUMBER) |
|---|---|---|
| 111011(59) | 011101(29) | 111011(59) |
| 110110(54) | 011011(27*) | 110110(54) |
| 011011(27) | 001101(13) | 011011(27*) Wait |
| 011011(27) | 001101(13) | 011011(27) |
| 101101(45) | 010110(22) | 101101(45) |
| 110111(55) | 011011(27*) | 110111(55) |
| 011011(27) | 001101(13) | 011011(27*) Wait |
| | | 011011(27) |

PROCESSOR CIRCUIT FOR HEAPSORTING

This application is a continuation of application Ser. No. 08/327,828 filed Oct. 24, 1994, now abandoned.

BACKGROUND OF THE INVENTION

1. Field of the Invention

The present invention relates to a processor circuit capable of sorting a train of data in a prescribed order at high speed, and more specifically to a sort processor circuit capable of generating heap data and sorting the train of data by heapsort at high speed.

2. Description of the Related Art

"Sorting" is an operation of arranging an arbitrary number of data in ascending order or descending order. Sorting is one of the basic operations in a computer system, and widely used in various applications. Therefore, if sorting can be performed at high speed, it is expected that application programs and jobs executed on computers can be performed at higher speed.

Studies for increasing speed in sorting have been made, starting almost simultaneously with the birth of computers. Various and many efforts have been made in this field, including proposals of hardware sort algorithms and trial of sort processors (integrated circuit devices for performing sorting exclusively). However, there is only a few hardware sort processors practically available at present which can process a large amount of data at high speed.

Though there are a number of algorithms for sorting, sort processors commercially available at present all utilize a so-called mergesort algorithm.

A method of sorting called heapsort has been known as opposed to mergesort. Heapsort is a method of sorting utilizing "heap data".

The heap is typically a data structure called a sorted labelled binary tree. One example is shown in FIG. 1.

The "binary tree" is defined as one satisfying the following conditions.

(a) A binary tree has a specific one node which is distinguished from other nodes, as shown by the node N1) of FIG. 1. This specific node is referred to as a root.

(b) Nodes other than the root can be divided into sets of nodes which do not have common portions. In the example shown in FIG. 1, the nodes can be divided into a set of nodes below the node N2), and a set of nodes below the node N3). A set of nodes satisfying the conditions (a) and (b) is referred to as a "tree".

(c) Every node has at most two subtrees. At this time, the node itself is called parent, and the node at the top of a subtree is called a child.

Brief definition of the binary tree is as given above. The binary tree realizes data structures having different meanings by defining relation of data between the parent and child at a branch.

"Heap" refers to a binary tree in which a prescribed relation holds between magnitudes of data of any parent and child. FIG. 1 shows one such example in which every parent has data of larger value than its child (children). In the example of FIG. 1, there is such a rule that parent's data has larger value than the child's data. Therefore, as can be understood from the example shown in FIG. 1, in heap data, the data at the root has the maximum (or minimum) value. However, there is no definite order between the two children branching from a parent.

One-dimensional array representation is one example of a data structure representing heap data. In the one-dimensional array representation, the parent-child relationship of the binary tree is obtained by address calculation. When heap data are to be stored in one-dimensional array, the following rule is applied. In the following description, it is assumed that there are n data to be stored, and the data are stored in a[1] to a[n] of a one dimensional array having n elements. The data corresponding to the root is simply referred to as "root", and similarly, data corresponding to parent and child are respectively referred to as "parent" and "child".

(1) In a[1], the root is stored.

(2) Children of a[i] are a[2i] and a[2i+1].

(3) Parent of a[i] (where i≠1) is a[i/2] (when i is an even number), or a [(i−1)/2] (when i is an odd number). In the following description, the parent of a [i] will be represented as a[i/2], no matter whether i is an even number or odd number.

When the heap data shown in FIG. 1 is stored in the one dimensional array in accordance with the rule mentioned above, data stored in one dimensional array such as shown in FIG. 2 results. As can be readily seen from the comparison between FIGS. 2 and 1, the data of the root is stored in a[1], the data of a child N2) is stored in a[2] and data of a child N3) is stored in a[3], and in this manner, children data are respectively stored in array elements determined in accordance with the above described rule.

A method of generating heap data will be described. It is assumed that n data are stored in an array a[1] to a[n], and there is no rule in the order of storing the data. The data will be made heap through the following processes.

(S1) A first node having a child (children) is found, going upward starting from the lowermost node of the binary tree. Assuming that every parent has two children, the node thus found corresponds to a[n/2].

(S2) A subtree below and including that node which was found in step S1 is made heap. More specifically, the following process is performed. In the following example, generation of heap data in which a parent has larger data than its child (children) is intended.

(Sa) A node of interest (parent) is compared with its children. If the parent is larger, the flow proceeds to step S3. If at least one of the children is larger, the larger one of the children and the parent are exchanged.

(Sb) The same process as the above described step Sa is repeated, starting from the position to which the node of interest has been transferred (the position is now the new node of interest), until the node of interest comes to be larger than any child, or until there is no child left.

(S3) The step S2 is repeated on every node going back from the node found in step S1, until the root is reached.

If heap data satisfying the condition that the parent is smaller than its children is to be generated, the relation of magnitudes between the parent and the child should be reversed.

A heapsort algorithm will be described. The heapsort algorithm is for sorting data in an ascending order or a descending order, utilizing the data which is made heap. Heapsort is performed in accordance with the following procedure. In the following, an example is discussed in which data is sorted in an ascending order, utilizing heap data in which parent is larger than its children.

(S1) Heap data is prepared as shown in FIG. 3. In the root of the heap data, the largest data is stored.

(S2) The root data and the last one of the heap data are exchanged. The state of this binary tree after this exchange is as shown in FIG. 4.

(S3) Data of the binary tree except the last data (in FIG. 5, "21") are arranged to be made heap. At this time, respective nodes of subtrees except the root are already made heap. Therefore, the new binary tree can be re-sorted to be heaped, simply by performing the step S2 of the process for generating heap data described above.

For example, in the binary tree shown in FIG. 4, at first the root and its child "16" are exchanged (FIG. 5). Then, the former root "4" which has been exchanged, and its child "13" are exchanged (FIG. 6). As is apparent from FIG. 6, the binary tree except the last data "21" is already heap. At this time, the second largest one of the original n data is stored in the root.

(S4) Steps S2 and S3 are repeated. Here, it is assumed that in step S2, the root of the binary tree which has been sorted into heap data in the immediately preceding step S3 is exchanged for the last data of the binary tree. Accordingly, the number of data of the binary tree which is re-sorted to provide heap data in step S3 decreases one by one.

For example, when the root "16" of the binary tree shown in FIG. 6 is exchanged for the last data "1" of the re-sorted binary tree, a binary tree shown in FIG. 7 results. By performing the step S2 of the process for generating heap data starting from the root "1" as described above, a binary tree shown in FIG. 8 is obtained. At this time, a third largest data of the original n data is stored in the root. Further, the root "13" shown in FIG. 8 is exchanged for the last data "8" of the re-sorted binary tree, and the step S2 of the process for generating heap data mentioned above is performed, focusing on the root.

Such processes are repeated thereafter. In that case, the number of data of the re-sorted binary tree decreases one by one as mentioned above. After resorting, largest data among the re-sorted data is stored in the root. Since this root is exchanged for the last data of the sorted binary tree, largest to smallest data are stored in order from the last node to the root of the binary tree.

When the process of step S4 is completed, such data as shown in FIG. 9 is obtained. The data shown in FIG. 9 is stored in such a one dimensional array as shown in FIG. 2, in accordance with the relation shown in FIGS. 1 and 2. It can be seen that finally, data are stored in an ascending order in this array. More specifically, by heapsort, n data are arranged in the ascending order, the result of which is stored in the one-dimensional array.

The heapsort algorithm described above has been conventionally known, and processed by means of a software, since it can be implemented by a prescribed procedure.

When the above described heapsort algorithm is to be implemented by a software, a number of data comparison and rewriting including nesting must be performed for one sorting, which hinders high speed operation. In a system utilizing a database, it is necessary to perform such sorting for a number of times, and therefore the overall processing time will be longer. In such a system, the amount of data to be processed is also large, and therefore overall sorting process requires considerably long time. Further, generation of heap data itself should preferably be performed at high speed.

SUMMARY OF THE INVENTION

Therefore, an object of the present invention is to provide a processor circuit capable of generating heap data at high speed.

Another object of the present invention is to provide a processor circuit capable of generating heap data easily and at high speed.

A still further object of the present invention is to provide a processor circuit capable of generating heap data correctly at high speed.

An additional object of the present invention is to provide a processor circuit capable of generating heap data at high speed and capable of reading generated heap data in parallel with the progress of processing.

Another additional object of the present invention is to provide a processor circuit capable of generating heap data conforming arbitrary one of a plurality of conditions at high speed, and capable of reading generated heap data in parallel with the progress of the processing.

A still further object of the present invention is to provide a processor circuit capable of generating heap data at high speed, and capable of performing heapsort at high speed.

A still further object of the present invention is to provide a processor circuit capable of generating heap data at high speed, performing heapsort at high speed and providing the result at high speed.

A further additional object of the present invention is to provide a processor circuit capable of generating heap data at high speed and properly performing heapsort at high speed.

The processor circuit in accordance with the present invention includes a memory array including a plurality of macro cells; a first selecting unit; a unit for inputting/outputting data between a macro cell of a selected address and outside; a second selecting unit; a third selecting unit; and an exchanging unit. Data is set in advance in each macro cell of the memory cell array by using the first selecting unit. When heap data is to be generated, an address signal of that macro cell which stores the data of interest is applied to the first selecting unit. The first selecting unit selects the first macro cell storing the data of interest in response to the address signal. The second selecting unit also selects two macro cells of two addresses having a prescribed relation with the address of the first macro cell, in response to this address signal. The third selecting unit compares contents of the two macro cells selected by the second selecting unit, and selects a second macro cell satisfying a predetermined condition out of the two macro cells. The exchanging unit compares the content of the first macro cell and the content of the second macro cell, and when the content of the first macro cell does not satisfy the predetermined condition with respect to the content of the second macro cell, exchanges the content of the first macro cell and the content of the second macro cell. As a result, by successively applying address signals in accordance with a prescribed algorithm, heap data in accordance with a predetermined condition can be readily formed in the memory cell array.

According to one aspect of the present invention, the second selecting unit of the processor circuit selects a macro cell having an address which is equal to twice the address of the first macro cell, and a macro cell having an address which is equal to twice the address of the first macro cell plus one. Assuming that the first macro cell corresponds to a certain node of the sorted binary tree, two macro cells storing the data of two children of said certain node are selected by the second selecting unit. Therefore, by applying address signals successively in accordance with a prescribed algorithm to the processor circuit, heap data in accordance with the data storing format of the sorted binary tree in one-dimensional array can be readily formed in the memory cell array.

According to another aspect of the present invention, the third selecting unit of the processor circuit selects a macro cell which stores larger value than the other macro cell. The content of the first macro cell is compared with and exchanged for one of the two macro cells selected by the second selecting unit that stores larger value. Therefore, in a sorted binary tree, when there is a child node storing data larger than the parent data, the data of the parent node is exchanged for the data of the child node. As a result, by successively applying address signals to the processor circuit in accordance with a prescribed algorithm, heap data satisfying the condition that any node has data larger than either of the two nodes branching therefrom can be readily formed in the memory cell array.

According to a still another aspect of the present invention, the processor circuit further includes an apparatus for generating a signal for inhibiting operation, upon detection of either of the following two conditions: that is, the address signal applied to a first selecting unit in a certain operation cycle is equal to 1) twice the address applied to the first selecting unit, or 2) equal to twice the address signal plus one applied to the first selecting unit, in the immediately succeeding operation cycle. It is determined whether an address signal applied to the first selecting unit in a certain operation cycle has the prescribed relation, which has been determined in the second selecting unit, with respect to an address signal applied to the first selecting unit in the immediately succeeding operation cycle. If this prescribed relation holds, a signal for inhibiting operation is generated. Assume that data is exchanged between the first and second macro cells by the exchanging unit in a certain operation cycle. When the address signal at this time satisfies the aforementioned prescribed condition with respect to the address signal applied next, the second selecting unit selects the first macro cell of the macro cells between which exchange of data has taken place, as the second macro cell of the next operation cycle. The third selecting unit compares the content of this macro cell with the content of another macro cell of which address satisfies the aforementioned prescribed condition. Since data exchange requires some time, there is a possibility that the contents of the macro cells which experienced the data exchange have not yet been correctly re-written. Therefore, the result of selection by the third selecting unit may possibly be erroneous. However, under such condition, the signal for inhibiting operation is generated as described above. Reference to this inhibiting signal readily disables the operation of the processor circuit until a correct result can be obtained, and therefore heap data can be generated easily without error.

According to an additional aspect of the present invention, the processor circuit further includes a fourth selecting unit. The fourth selecting unit enables the second selecting unit in response to a first value of an operational mode setting signal, and disables the second selecting unit in response to a second value of the operational mode setting signal. The fourth selecting unit further selects the macro cell of the first address of the memory cell array as the second macro cell. When the operational mode setting signal assumes the first value, the second selecting unit is enabled. Between the macro cell selected by the second and third selecting units and the first macro cell selected by the first selecting unit, comparison/exchange is effected by the exchanging unit. When the operational mode setting signal assumes the second value, the second selecting unit is disabled, and the macro cell at the first address of the memory cell array is selected as the second macro cell. Therefore, between the first macro cell selected by the first selecting unit and the macro cell of the first address of the memory cell array, comparison/exchange by the exchanging unit is performed. As a result, by changing the values of the operational mode setting signal and of the address signal in accordance with a prescribed algorithm, not only generation of heap data but also sorting of thus formed heap data can be performed easily at high speed.

According to another additional aspect of the present invention, the processor circuit further includes a unit for reading the content of the macro cell of the first address of the memory cell array. While the heapsort is being carried out, data is stored in turn and in order under a prescribed condition determined by the sorting condition, in the macro cell at the first address of the memory cell arrays. Therefore, of the results of heapsorting, one which has been established can be read in parallel to the operation of the processor circuit. Therefore, even if the number of data is formidable, the result of heapsort can be obtained without time delay.

According to a still another additional aspect of the present invention, the processor circuit further includes a unit for detecting whether exchange of the contents of the first and second macro cells is performed by the exchanging unit and for generating an exchange detection signal, and an operational mode setting unit for selectively setting the operational mode setting signal to a first or a second value, dependent on the value of the exchange detection signal. When the contents of the first and second macro cells are exchanged, the operational mode setting signal is set to the first value, while when the exchange does not take place, the operational mode setting signal is set to the second value. So long as the contents of the first and second macro cells are exchanged, the content of the first macro cell and the content of the macro cell selected by the third selecting unit are compared/exchanged. However, when the exchange between the content of the first macro cell and the content of the second macro cell is not performed, such operation is completed, and the content of the first macro cell and the content of the macro cell at the first address of the memory cell array are compared/exchanged. Since completion of heap data generation in the heapsort is automatically detected and the value of the operation mode setting signal is changed, heapsort can be performed easily only by applying an address signal selecting the node of interest at a prescribed order, to the first selecting unit of the processor circuit.

According to a still another additional aspect of the present invention, the processor circuit further includes a unit for detecting an address of the second macro cell and for outputting a selected address signal, and an address selecting unit responsive to the exchange detection signal assuming that value which indicates detection of exchange, for applying the address specified by the selected address signal to the first selecting unit. When the content of the first and second macro cells are exchanged, the address of the second macro cell is applied to the first selecting unit as the selected address signal. The macro cell which has been selected as the second macro cell in the immediately preceding operation cycle and of which contents has been exchanged for the content of the first macro cell is selected as the first macro cell in the immediately succeeding operation cycle. It is possible to trace only the content of the first selected first macro cell so that it is compared with/exchanged for the second macro cell, until exchange between the contents of the first and second macro cells becomes unnecessary or completed. Access to a macro cell which is not directly related to the processing is unnecessary. Therefore, generation of heap data during heapsorting can be performed automatically at high speed. Since generation of heap data is repeated a number of times during heapsorting, heapsorting can be performed far faster than in the prior art.

According to a still another additional aspect of the present invention, the processor circuit includes a memory array including a plurality of macro cells, a first selecting unit, a second selecting unit, a third selecting unit, a first data line, and a second data line. When a first address enable signal is applied to the processor circuit, the first selecting unit is enabled and selects an arbitrary first macro cell of the memory cell array in response to a first address signal. The data of interest can be stored in each macro cell of the memory cell array through the first data line. When a second address enable signal is applied, the second selecting unit is enabled, and selects two macro cells of respective two addresses having prescribed relation with the first address signal, in response to a second address signal. The third selecting unit compares the contents of the two macro cells selected by the second selecting unit, and selects a second macro cell satisfying a predetermined condition out of the two macro cells. By applying the first and second address enable signals and the first and second address signals, the content of the macro cells selected by the first address signal is read out to the first data line, and the contents of the macro cell satisfying a prescribed condition of the two macro cells selected by the second address signal is read out to the second data line. When these two data are compared with each other and the data on the first data line does not satisfy a predetermined condition with respect to the data on the second data line, these two data are exchanged and written to the original macro cells. By doing so, generation of heap data and heapsorting can be performed by applying the first and the second address signals in accordance with a prescribed algorithm. Whether the processing by this processor circuit should be performed or not can be selected by applying or not applying the first and the second address enable signals. By connecting a plurality of the processor circuits, it is possible to form a memory cell array having larger number of macro cells, and to form heap data by using the memory cell array. Further, it is possible to disable the second selecting unit. By adding a specific circuit, a circuit for performing heapsort easily can be implemented. Therefore, it is possible to form a memory cell array including larger number of macro cells by connecting a plurality of processor circuits and it is also possible to form heap data by using the memory cell array. As the second selecting unit can be disabled, a circuit performing heapsort in a simple manner can also be implemented. As a result, a processor circuit capable of heapsorting not restricted the number of data to be processed can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 shows, in a table, operations of the first and second decoders.

FIG. 26 shows, in a table, the operation of the address determining circuit.

DETAILED DESCRIPTION OF THE PREFERRED EMBODIMENT

Processor circuits in accordance with six embodiments of the present invention will be described in order in the following. The processor circuit in accordance with the first embodiment shown in FIGS. 10 to 26 is a circuit for generating heap data.

Figure 27:
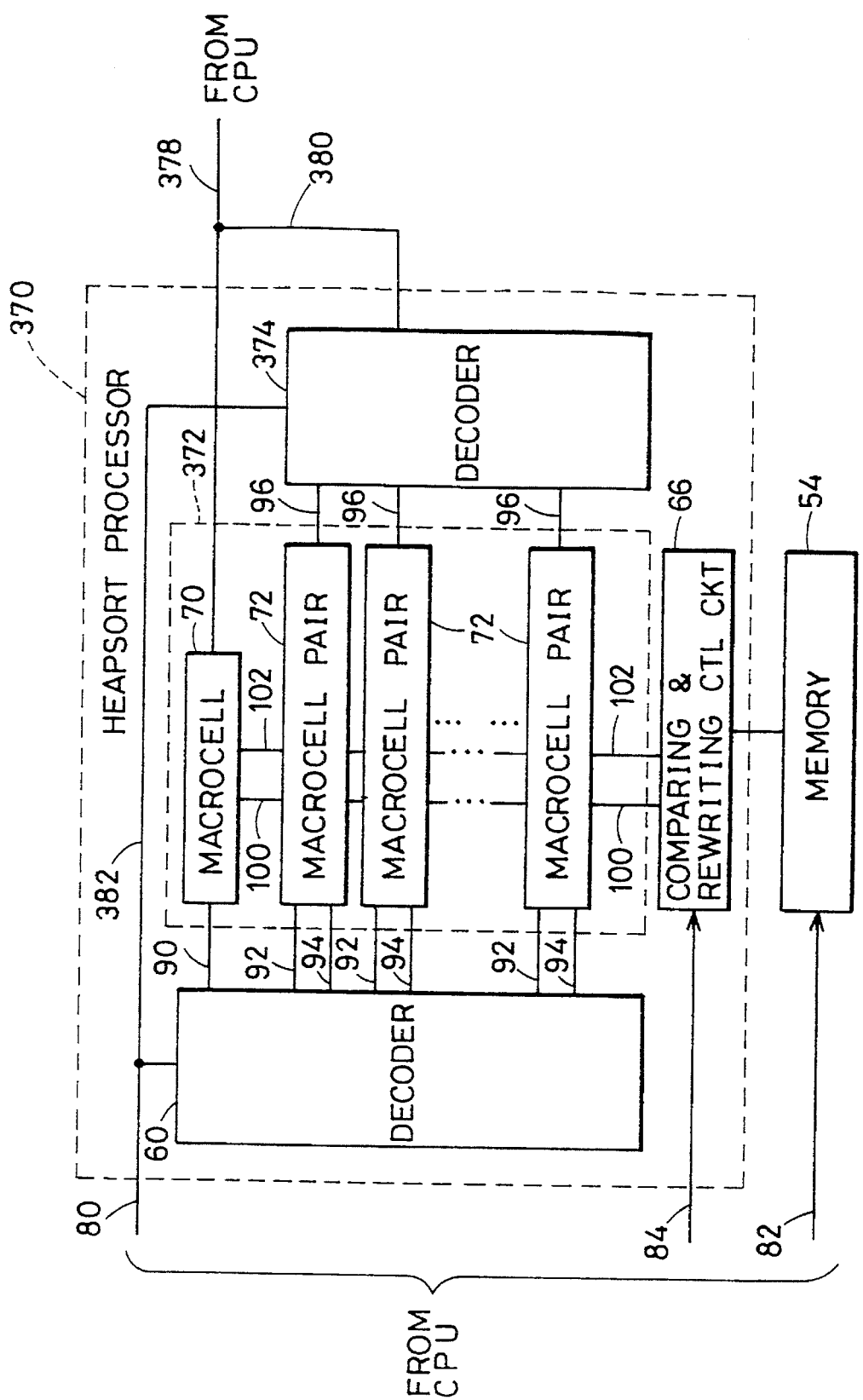
FIG. 27 is a block diagram of a heapsort processor in accordance with a second embodiment.
Figure 28:
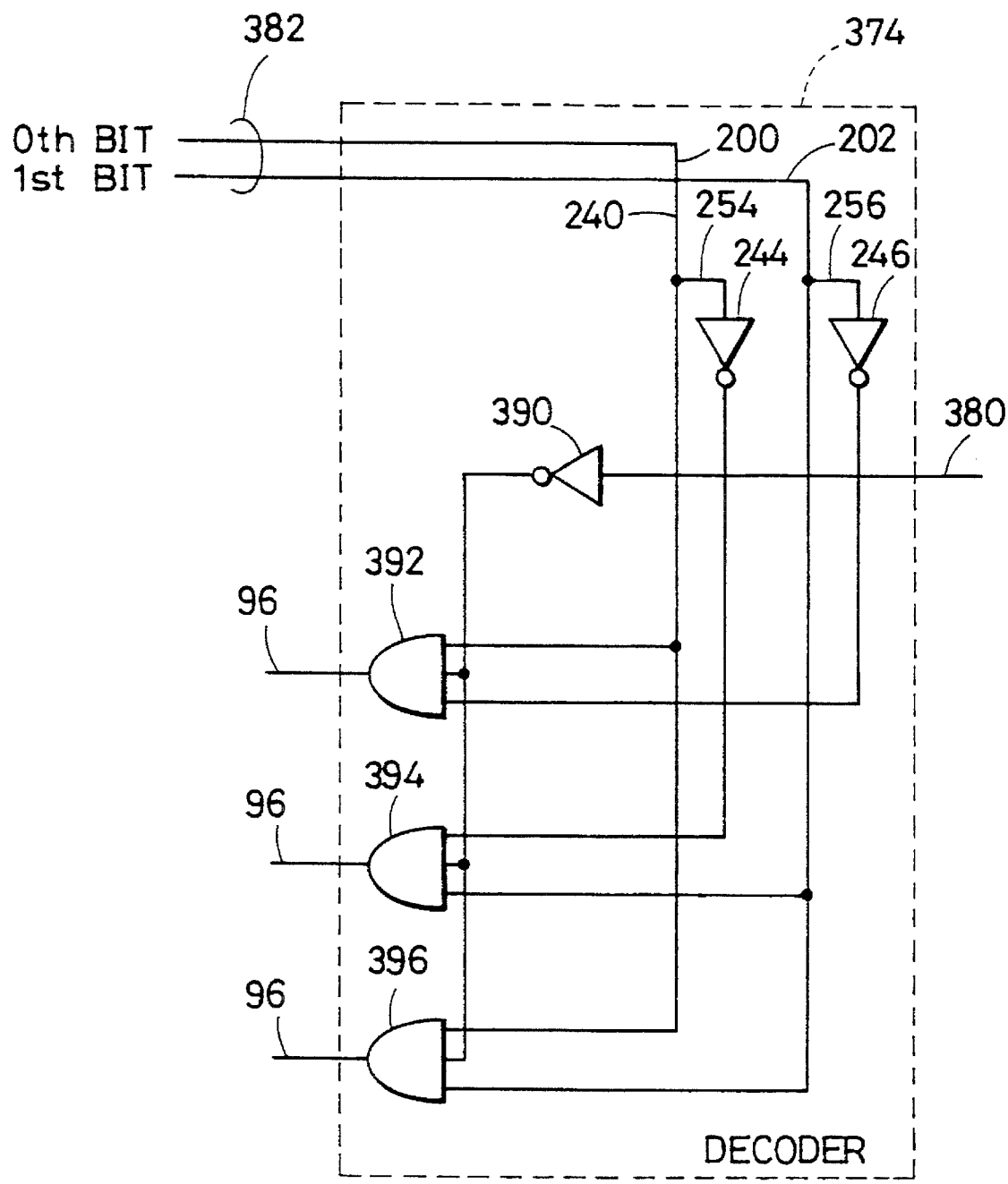
FIG. 28 is a schematic diagram of a decoder of the second embodiment.

The processor circuit of the second embodiment shown in FIGS. 27 and 28 performs heapsort at high speed, under external control.

Figure 29:
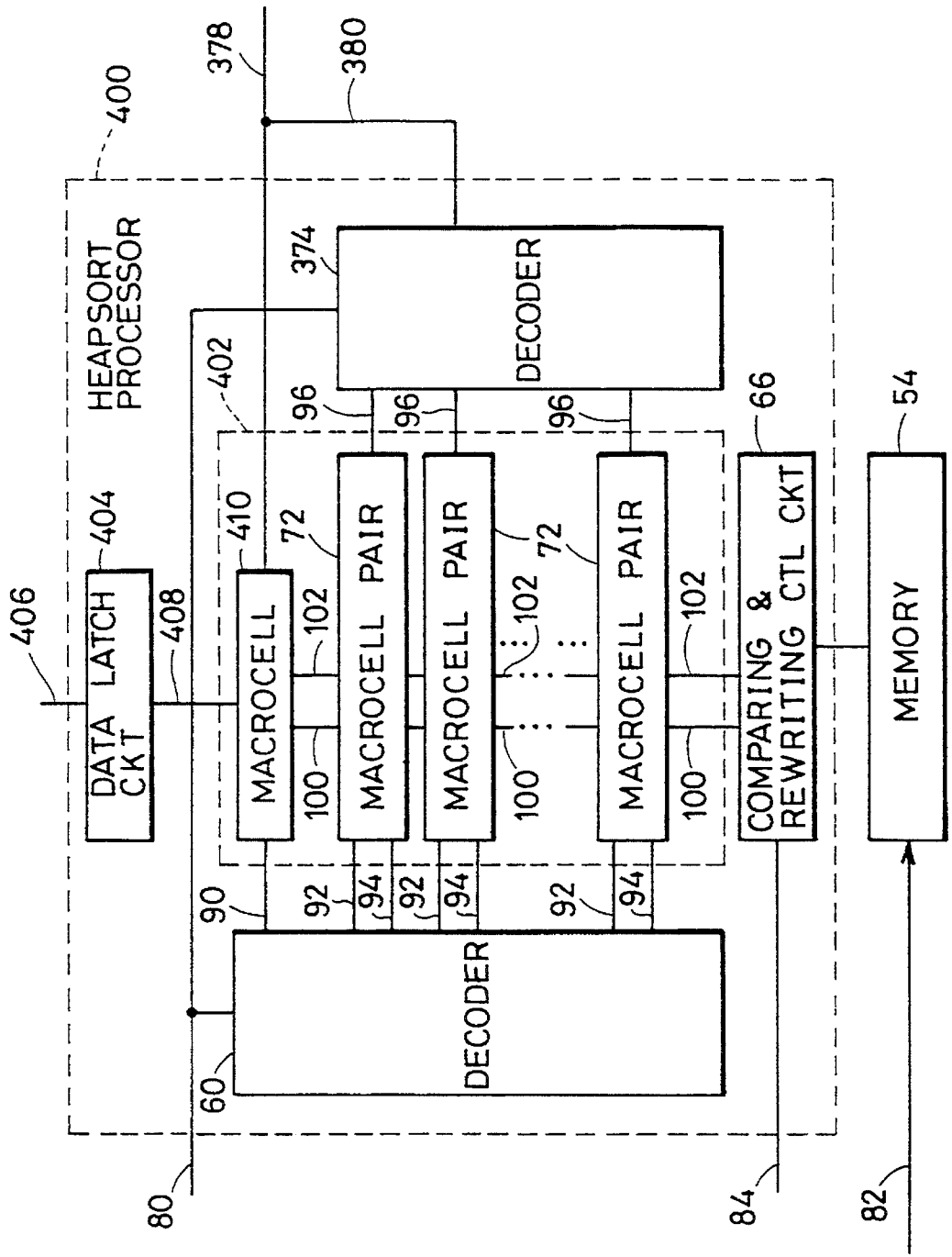
FIG. 29 is a block diagram of a heapsort processor of a third embodiment.

The processor circuit in accordance with the third embodiment shown in FIG. 29 performs heapsort at high speed under external control, and allows reading of the result in parallel with the execution of heapsort.

The processor circuit of the fourth embodiment shown in FIGS. 30 to 33 performs heapsort at high speed under external control and allows reading of data parallel to the heapsorting, in which heapsort in the ascending order and descending order can be switched.

In the processor circuit in accordance with the fifth embodiment shown in FIGS. 34 to 37, when prescribed data is externally applied and heap data is generated under external control, then heapsort can be automatically performed at high speed. Further, in this circuit, the result of sorting can be read in parallel to the execution of sorting, and the order of sorting of data can be designated.

Figure 38:
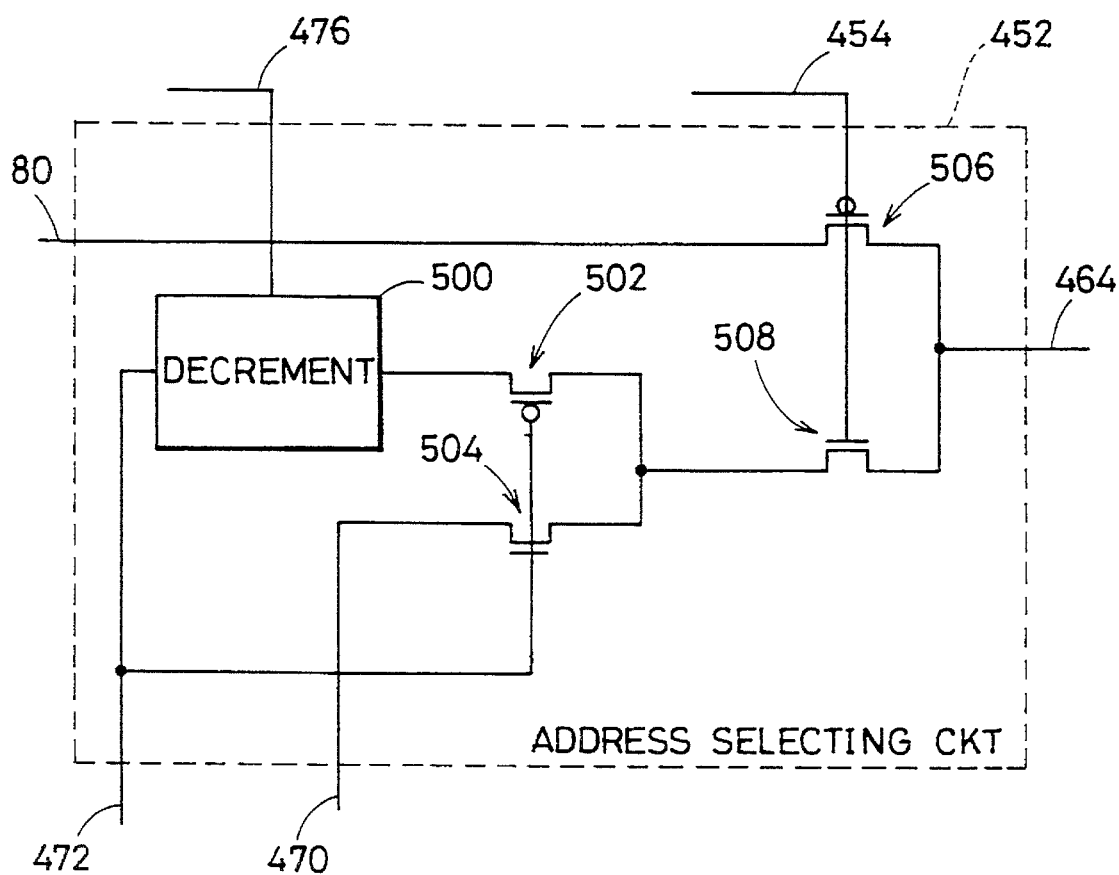
FIG. 38 is a block diagram of an address selecting circuit.
Figure 39:
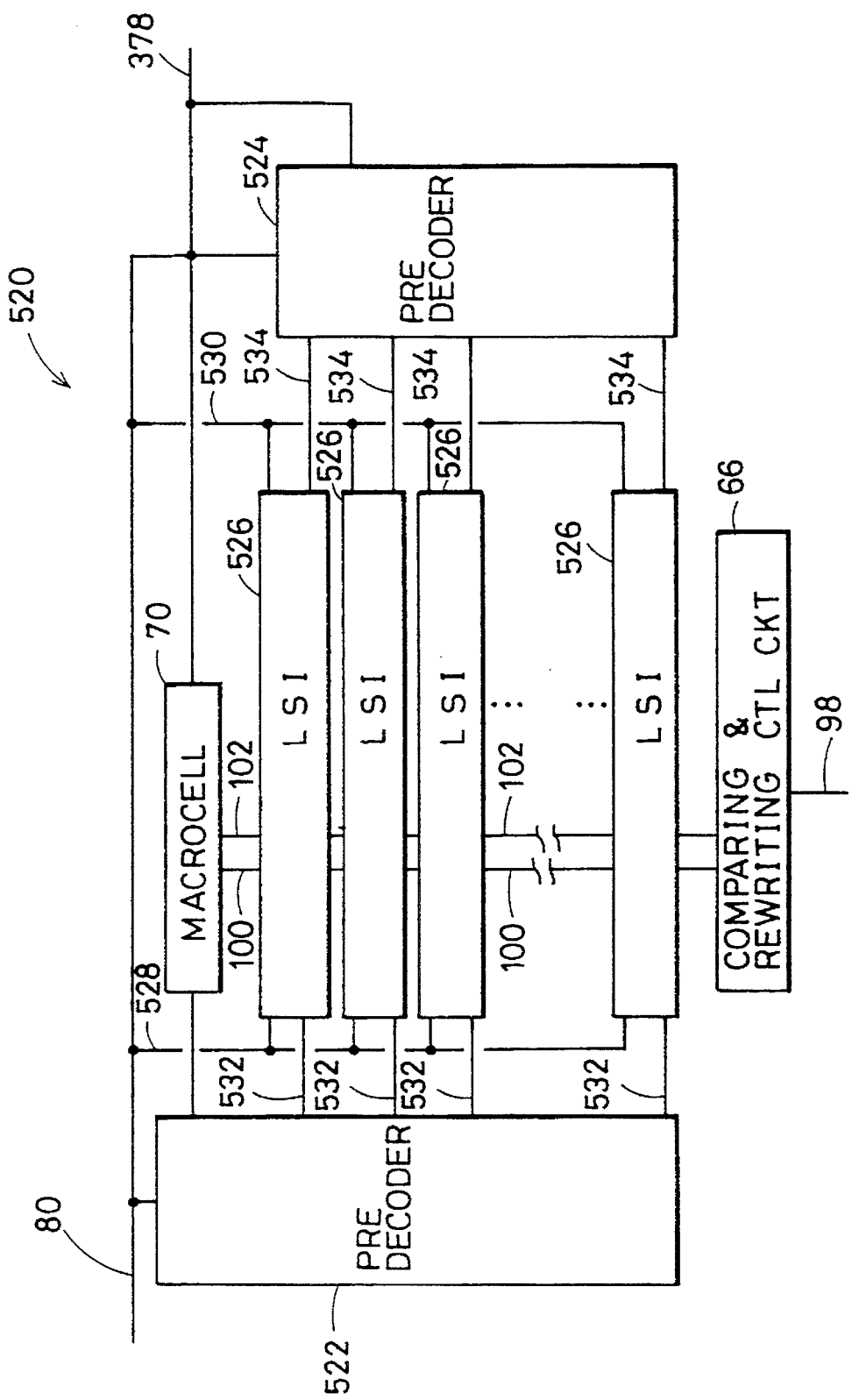
FIG. 39 is a block diagram of a heapsort processor system in accordance with a sixth embodiment of the present invention.

In accordance with the sixth embodiment of the processor circuit shown in FIGS. 38 and 39, by combining a plurality of circuits having identical structure, a circuit for performing sorting of a desired number of data can be implemented.

First Embodiment

Figure 10:
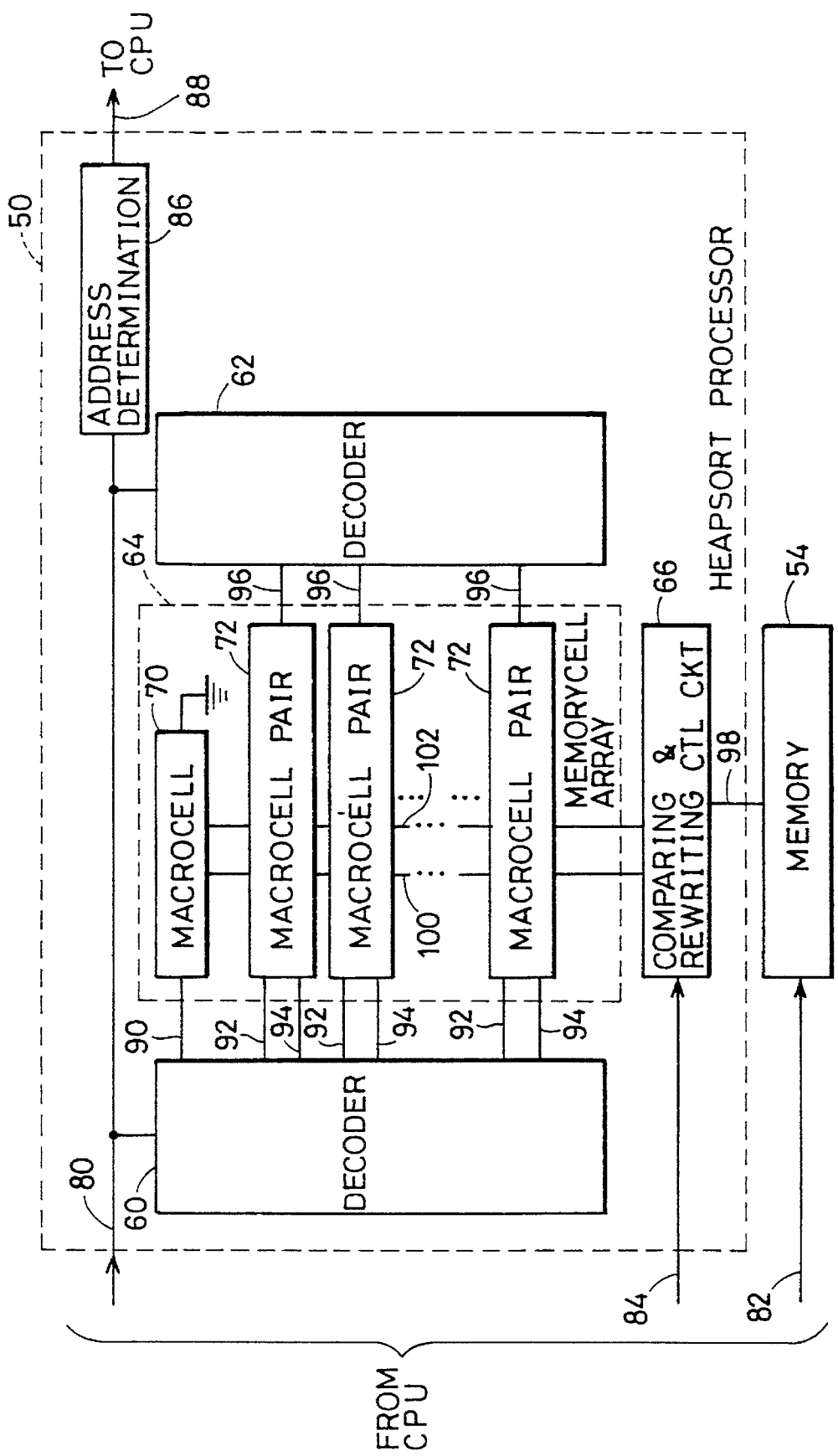
FIG. 10 is a block diagram of a heapsort processor in accordance with a first embodiment of the present invention.

Referring to FIG. 10, a heapsort processor 50 which is a processor circuit in accordance with the first embodiment of the present invention is used connected to a memory 54 and a CPU which is not shown. Memory 54 is for prestoring data to be heapsorted, and for applying the data to macro cells, which will be described later, in heapsort processor 50. Memory 54 is also used for storing data read from heapsort processor 50.

Heapsort processor 50 includes a memory cell array 64, first and second decoders 60 and 62, an address determining circuit 86 and a comparing and rewriting control circuit 66. Address determining circuit 86 is not essential.

Memory cell array 64 includes a first macro cell 70 and a plurality of macro cell pairs 72. In each macro cell pair 72, a pair of macro cells similar to macro cell 70 are provided, as will be described later. Macro cell 70 and macro cells in macro cell pairs 72 are connected to comparing and rewriting control circuit 66 through bit lines 100 and 102 of plural bits. Macro cell 70 and macro cells in macro cell pairs 72 are each a word unit circuit including a data holding portion and a 2-port read write circuit, which is similar to a common 2-port memory circuit.

Decoder 60 decodes an address signal 80 applied from the CPU, not shown, and selects one of the macro cells in memory cell array 64 by a selection signal line 90 for the first macro cell 70 and selection signal lines 92 and 94 for the macro cells included in each macro cell pair 72. The selected macro cell is connected to bit Line 100.

Decoder 62 decodes 2 bits out of address signal 80 from the CPU, not shown, and selects one of the plurality of macro cell pairs 72 by an address decode signal line 96, as will be described later.

Comparing and rewriting control circuit 66 is for performing writing and reading of data to and from macro cells in memory cell array 4 and for performing data exchange between macro cells, which will be described later, in response to a clock signal applied through a comparing and rewriting control signal line 84 from the CPU, not shown, and external data write signal, and a rewrite signal.

Address determining circuit 86 determines whether or not a prescribed relation described later holds between an address signal applied through address signal line 80 in a certain operation cycle and address data applied through address signal line 80 in the next operation cycle, and when it holds, address determining circuit 86 provides a wait signal for temporarily stopping control operation by the CPU. The process which takes place in address determining circuit 86 will be described later with reference to FIG. 25.

Memory 54 operates in response to a control signal applied from the CPU through memory control signal line 82.

Figure 11:
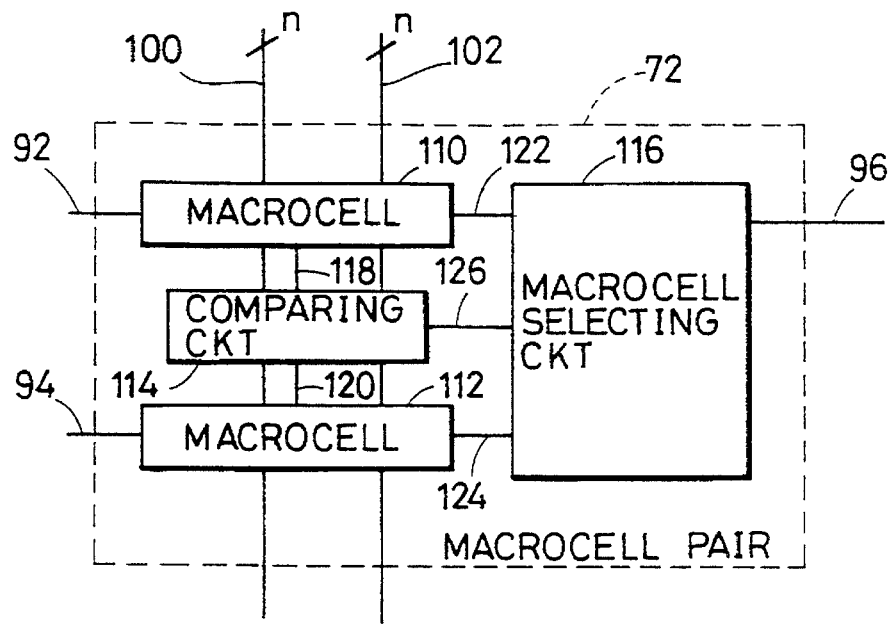
FIG. 11 is a block diagram of a macro cell pair.

Referring to FIG. 11, macro cell pair 72 includes a pair of macro cells 110 and 112 both connected to bit lines 100 and 102; a comparing circuit 114 connected to macro cells 110 and 112 through data lines 118 and 120, respectively; and a macro cell selecting circuit 116 connected to an address decode signal line 96 from a second decoder 62 (see FIG. 10) and to a comparison determining signal line 126 from comparing circuit 114, responsive to an address decode signal and a comparison determining signal, for selecting either macro cell 110 or 112, and for applying a selection signal to selection signal line 122 or 124.

Macro cell 110 is connected to bit line 100 in response to a selection signal applied through selection signal line 92, and connected to bit line 102 in response to a selection signal applied through selection signal line 122, respectively. Macro cell 112 is connected to bit line 100 in response to a selection signal applied through selection signal line 94, and to bit line 102 in response to a selection signal applied through selection signal line 124, respectively.

Figure 12:
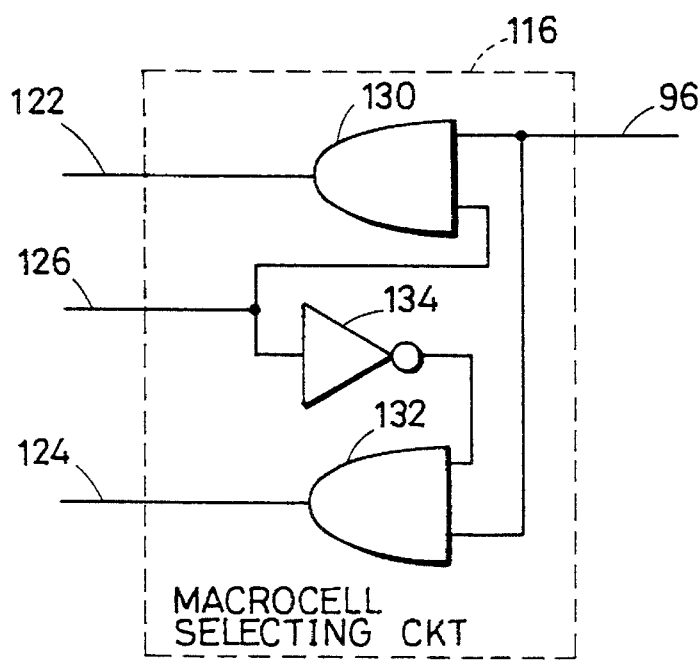
FIG. 12 is a block diagram of a macro cell selecting circuit.

Referring to FIG. 12, macro cell selecting circuit 116 includes two AND circuits 130 and 132, and an NOT circuit 134. AND circuit 130 has one input connected to address decode signal line 96 and another input connected to comparison determination signal line 126. Output from AND circuit 130 is connected to selection signal line 122.

To the input of NOT circuit 130, comparison determination signal line 126 is connected, and the output is connected to one input of AND circuit 132. The other input of AND circuit 132 is connected to address decode signal line 96. The output from AND circuit 132 is connected to selection signal line 124.

The function of macro cell selecting circuit 116 is as follows. When logic 0 is applied to selection signal line 96, the outputs from selection signal lines 122 and 124 are both logic 0. Therefore, neither macro cell 110 nor 112 shown in FIG. 11 is selected.

Assume that the decode signal applied to address decoder signal line 96 attains to logic 1. When comparison determination signal line 126 is logic 1, the output from AND circuit 130 will be logic 1. Meanwhile, the output from AND circuit 132 will be logic 0. Therefore, the signal on selection signal line 122 attains to logic 1, the signal on selection signal line 124 attains to logic 0, and macro cell 110 is selected. If the signal on comparison determination signal line 126 is logic 0, the logics will be reversed, and macro cell 112 is selected.

Comparing circuit 114 (FIG. 11) compares the contents stored in macro cells 110 and 112, and when the content stored in macro cell 110 is larger, it provides a logic 1 signal to comparison determination signal line 126, as will be described later. Therefore, by macro cell selecting circuit 116 and comparing circuit 114, one of the two macro cells 110 and 112 which is storing larger data is selected and connected to bit line 102. Here, as shown in FIG. 10, of the two selection signal lines of macro cell 70, one corresponding to selection signal lines 122 and 124 is grounded. Therefore, macro cell 70 is not connected to the second bit line 102.

Figure 13:
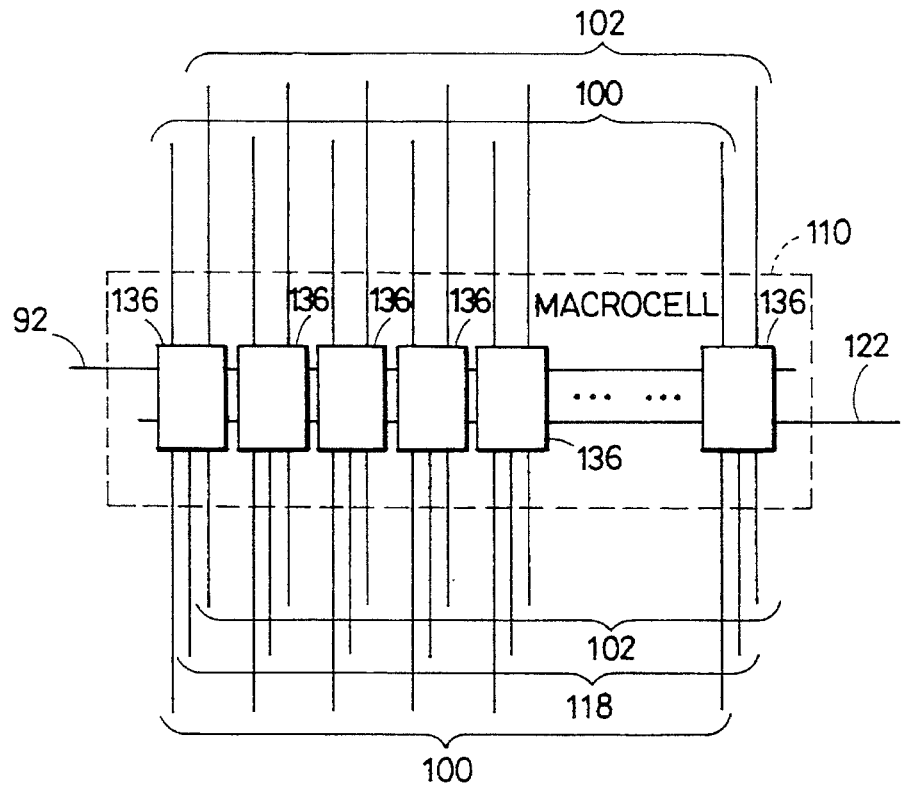
FIG. 13 is a block diagram of a first macro cell.

Referring to FIG. 13, macro cell 110 includes a plurality of 1 bit data memory circuits 136. Each memory circuit 136 is connected to selection signal line 92, selection signal line 122, bit line 100, bit line 102 and data line 118. As will be described later, every 1 bit data memory circuit 136 has the same structure.

Figure 14:
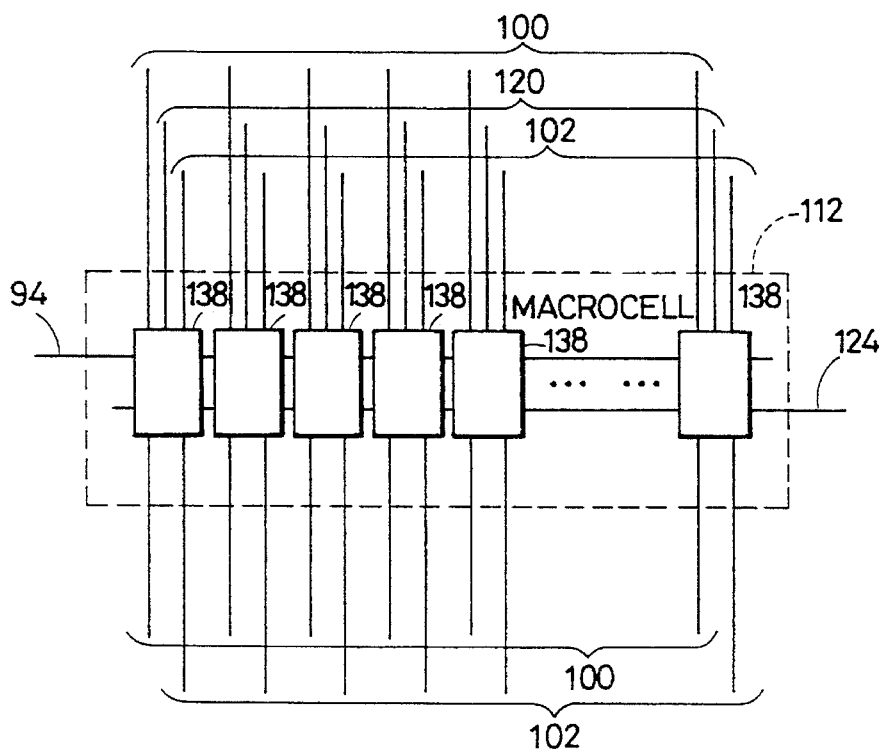
FIG. 14 is a block diagram of a second macro cell.

Referring to FIG. 14, macro cell 112 also includes a plurality (8) of 1 bit data circuits 138. Each data memory circuit 138 is connected to selection signal line 94, selection signal line 124, first bit line 100, second bit line 102 and data line 120. Each 1 bit data memory circuit 138 has identical structure as the 1 bit data memory circuit 136 shown in FIG. 13. Therefore, in the following, only the 1 bit data memory circuit 136 shown in FIG. 13 will be described.

Figure 15:
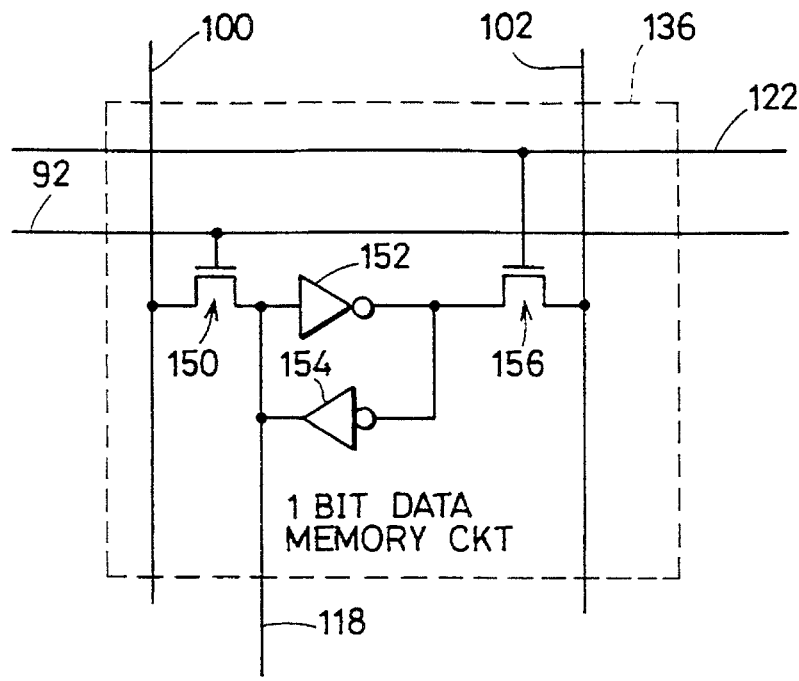
FIG. 15 is a schematic diagram of a 1 bit data memory circuit.

Referring to FIG. 15, 1 bit data memory circuit 136 includes n channel transistors 150 and 156, and a pair of NOT circuits 152 and 154 connected antiparallel between one end of transistor 150 and one end of transistor 156. The transistors 150 and 156 are connected at the other end, to the first bit line 100 and the second bit line 102, respectively. The output of NOT circuit 154 is connected to data line 118. Gate electrodes of transistors 150 and 156 are connected to selection signal lines 92 and 122, respectively.

Figure 16:
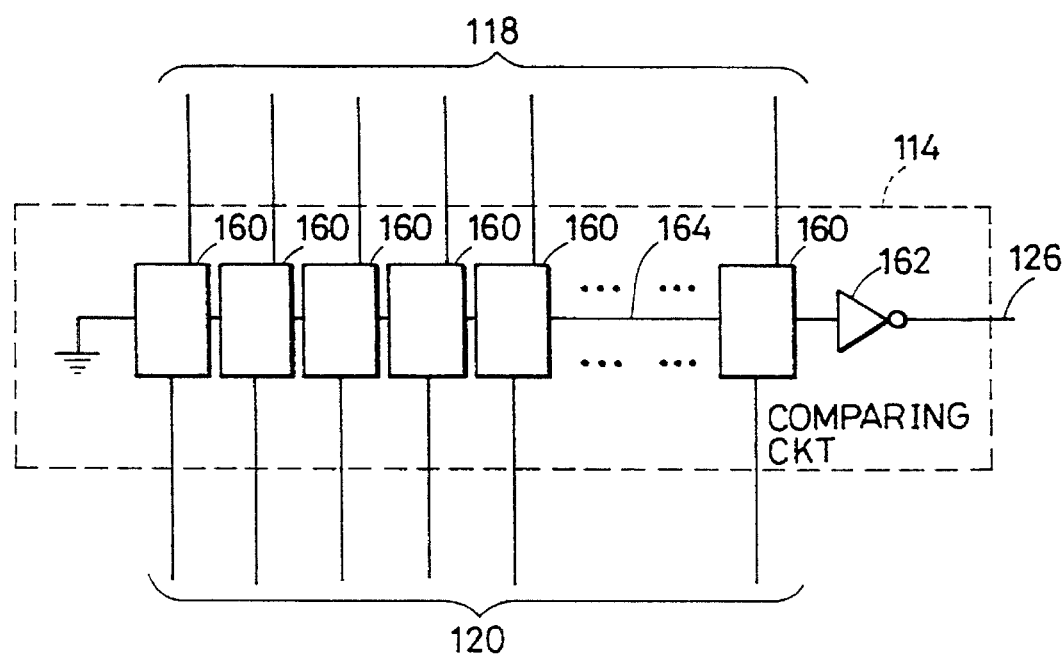
FIG. 16 is a block diagram of a comparing circuit.

Referring to FIG. 16, comparing circuit 114 includes a plurality of 1 bit comparing circuits 160 connected in series by a line 164, and a NOT circuit 162 having its input connected to line 164 and its output connected to comparison determination signal line 126. Each 1 bit comparing circuit 160 is connected to corresponding one of data lines 118 and corresponding one of data lines 120.

Figure 17:
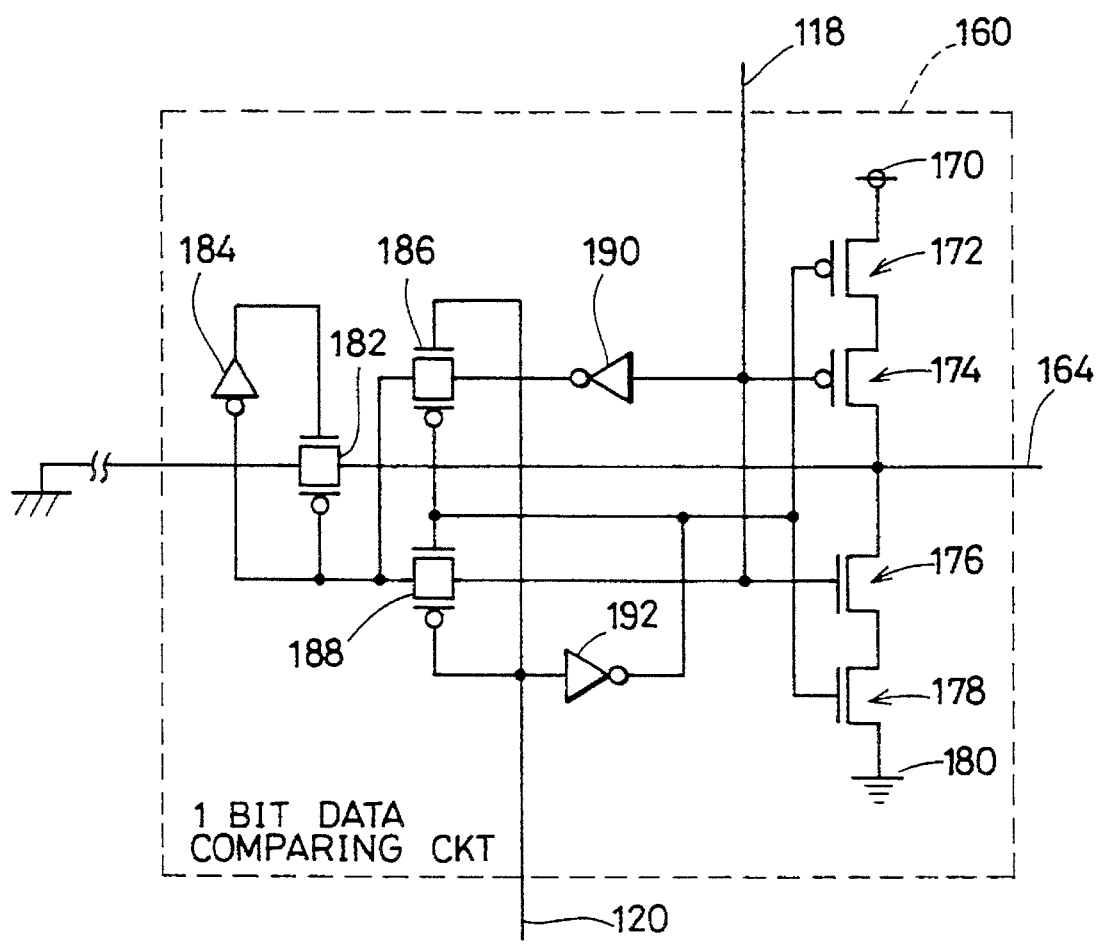
FIG. 17 is a schematic diagram of a 1 bit data comparing circuit.

Referring to FIG. 17, 1 bit comparing circuit 160 includes p channel transistors 172 and 174, n channel transistors 176 and 178, NOT circuits 184, 190 and 192, and transmission gates 182, 186 and 188. Transistors 172 and 174 have their input/output terminals connected in series between power supply potential 170 and line 164. Transistors 176 and 178 have their input/output terminals connected in series between line 164 and ground potential 180. Gate electrodes of transistors 174 and 176 are commonly connected to data line 118.

NOT circuit 192 has its input connected to data line 120. To the output of NOT circuit 192, gate electrodes of transistors 172 and 178 are commonly connected.

Transmission gate 182 has its input/output terminals connected such that the gate 182 is inserted in line 164. Transmission gate 182 has one control terminal connected with an input of NOT circuit 184 and one of input/output terminals of transmission gate 186, and the other control terminal connected to the output of NOT circuit 184.

Transmission gate 186 has the other input/output terminal connected to the output of NOT circuit 190, and its control terminals connected to data line 120 and to the output of NOT circuit 192, respectively.

Transmission gate 188 has its input/output terminals connected to one input/output terminal of transmission gate 186 and to data line 118, respectively. Transmission gate 188 has its control terminals connected to data line 120 and to the output of NOT circuit 192, respectively. As shown in FIG. 16, at the leftmost one (on the side of least significant bit) of 1 bit data comparing circuits 160, line 164 is connected to the ground potential.

Figure 18:
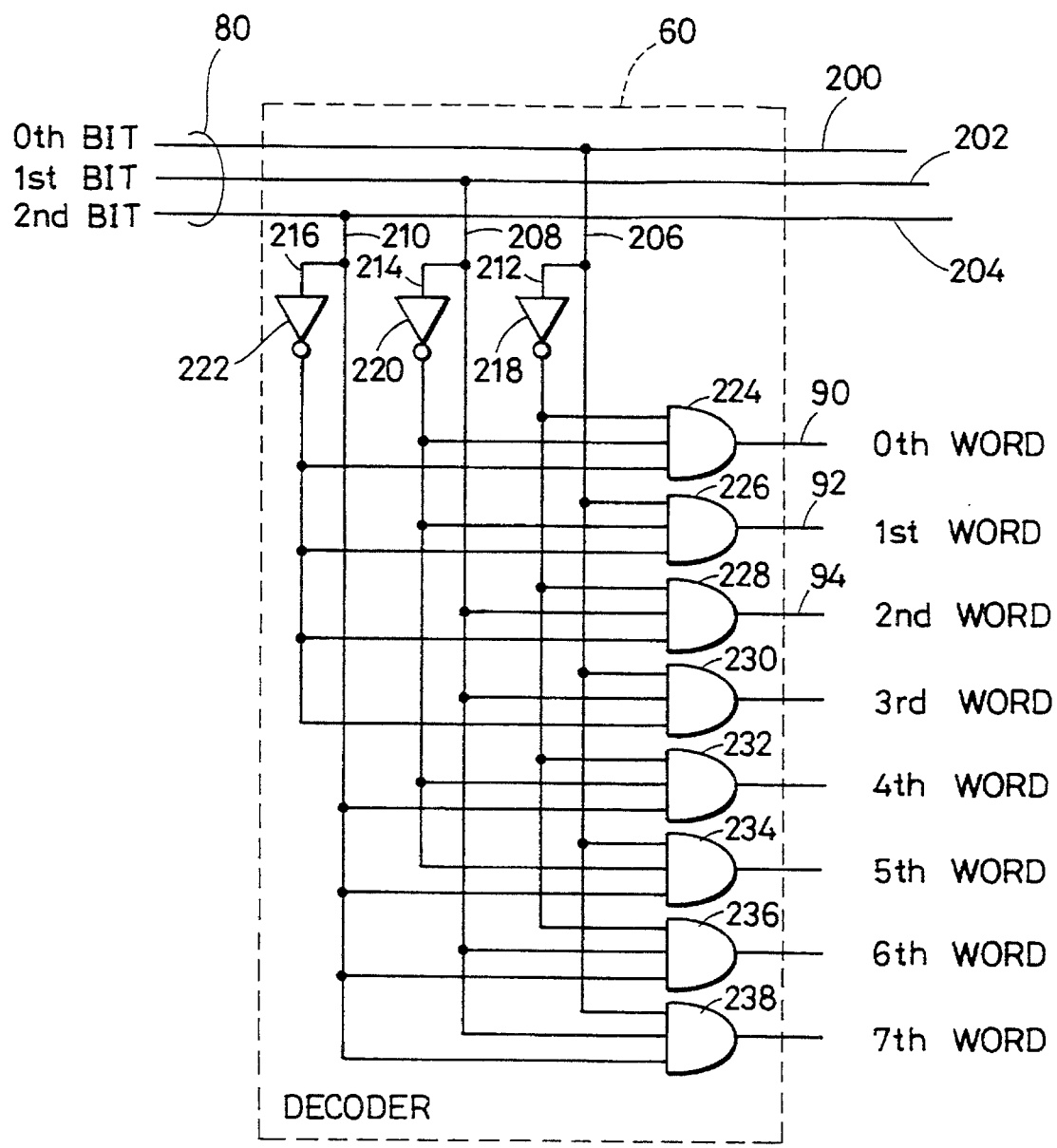
FIG. 18 is a block diagram of a first decoder.

Referring to FIG. 18, first decoder 60 includes three NOT circuits 218, 220, and 222 and eight AND circuits 224, 226, 228, 230, 232, 234, 236 and 238. Address signal line 80 includes a 0th bit line 200, a first bit line 202 and a second bit line 204, which branch to branch lines 206, 208 and 210, respectively, in the first decoder 60. Respective branch lines 206, 208 and 210 further branch to branch lines 212, 214, and 216 in the first decoder.

Branch line 106 is connected to ones of the inputs of AND circuits 226, 230, 234 and 238. Branch line 212 is connected to the input of NOT circuit 218, and the output of NOT circuit 218 is connected to ones of the inputs of AND circuits 224, 228, 232 and 236. Branch line 208 is connected to ones of the inputs of AND circuits 228, 230, 236 and 238. Branch line 214 is connected to the input of NOT circuit 220, and the output of NOT circuit 220 is connected to ones of the inputs of AND circuits 224, 226, 232, 234. Branch line 210 is connected to ones of the inputs of AND circuits 232, 234, 236 and 238. Branch line 216 is connected to the input of NOT circuit 222, and the output of NOT circuit 222 is connected to ones of the inputs of AND circuits 224, 226, 228 and 230.

The output of AND circuit 224 is connected to a selection signal line 90 for the 0th word (macro cell 70 shown in FIG. 10). Likewise, outputs of AND circuits 226, 230, 234 and 238 are connected to selection signal line 92, and outputs of AND circuits 228, 232, 236 are connected to selection signal line 94. Therefore, these selection signal lines 92 and 94 respectively include a plurality of selection signal lines. It should be understood that though labelled by the same reference characters in FIG. 10, the plurality of selection signal lines 92 and 94 are separate selection signal lines for selecting separate words.

Figure 19:
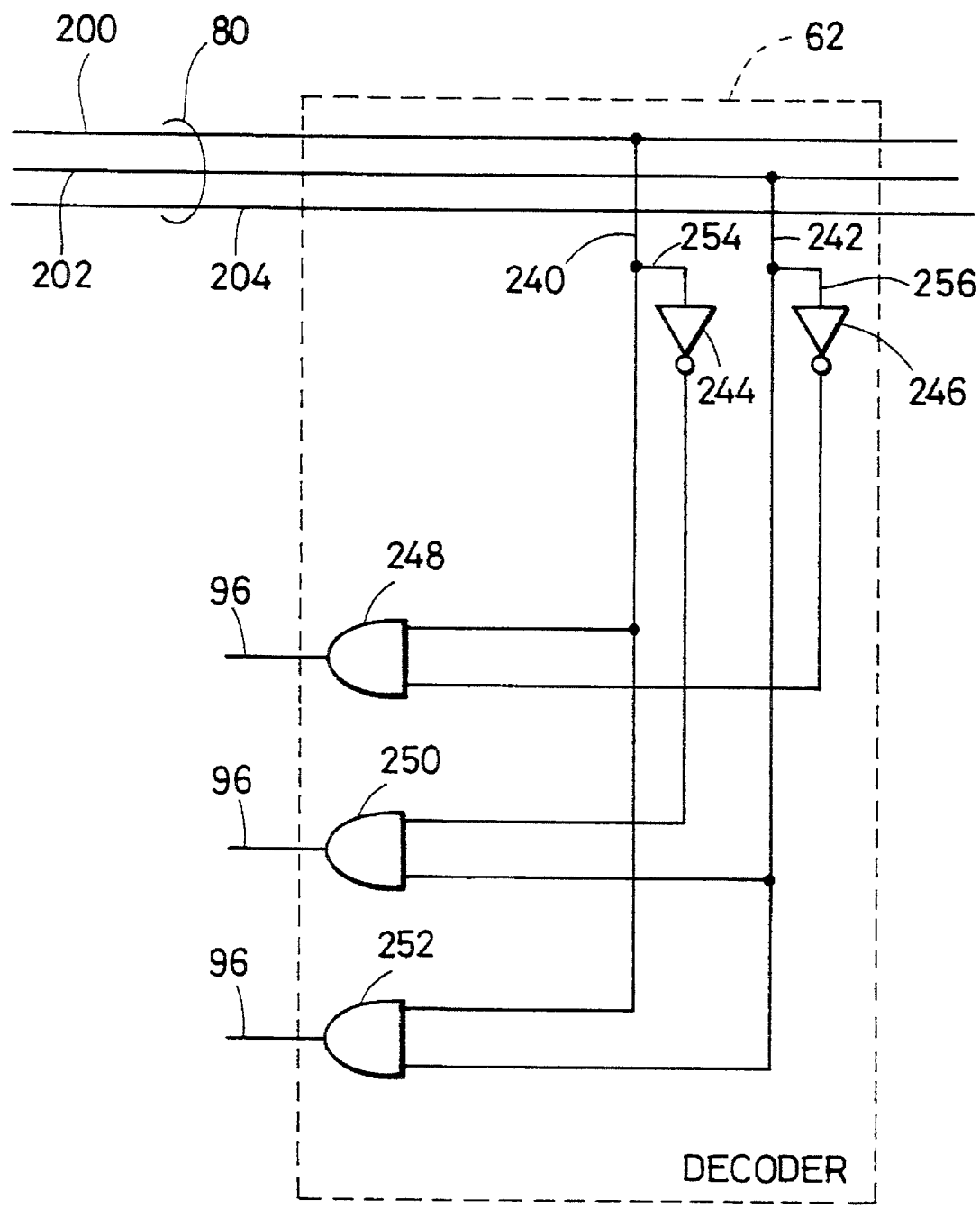
FIG. 19 is a schematic diagram of a second decoder.

Referring to FIG. 19, second decoder 62 includes NOT circuits 244 and 246, and three 2-input AND circuits 248, 250 and 252.

The 0th bit line 200 and the first bit line 202 in address signal line 80 branch to branch lines 240 and 242 in second decoder 62, respectively. Branch lines 240 and 242 further branch into branch lines 254 and 256.

Branch line 240 is connected to one input of each of AND circuits 248 and 252. Branch line 254 is connected to the input of NOT circuit 244, and the output of NOT circuit 244 is connected to one input of AND circuit 250.

Branch line 242 is connected to the other input of each of AND circuits 250 and 252. Branch line 256 is connected to the input of NOT circuit 246, and the output of NOT circuit 246 is connected to the other input of AND circuit 248. Outputs of AND circuits 248, 250 and 252 are connected to selection signal line 96 for the first, second and third macro cell pairs, respectively.

The selecting operation of the first and second decoders 60 and 62 shown in FIGS. 18 and 19 will be briefly described with reference to FIG. 20. Referring to FIG. 20, an example in which an external address assumes 8 different values of 0 to 7 in decimal notation will be considered separately. In the second column of the table of FIG. 20, external addresses in binary notation are given. In the third column of FIG. 20, addresses of selected words of decode circuit 60 are given, and in the fourth column, selected word addresses of decode circuit 62 are given. If the external address is 4 or more, there is not a word selected in decode circuit 62 in this embodiment. However, if a large number of macro-cells are arranged, the selection word value of decode circuit 62 changes as shown in the brackets of FIG. 20.

Referring to FIG. 20, when the external address is 1 in decimal notation, decode circuit 60 selects the first word, and decode circuit 62 selects the second and third words, respectively. If the external address is 2, decode circuits 60 and 62 select the second word, and the fourth and fifth words, respectively. When the external address is 3, decode circuits 60 and 62 select the third word, and the sixth and seventh words, respectively.

Figure 21:
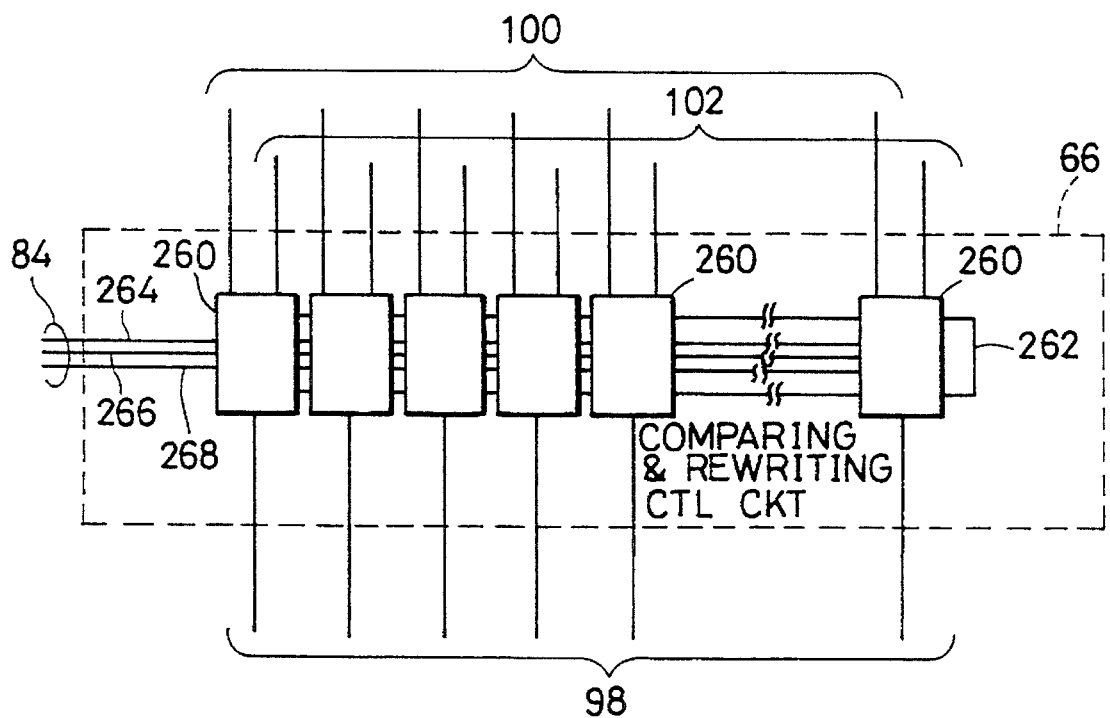
FIG. 21 is a block diagram of a comparing and rewriting control circuit.

Referring to FIG. 21, the comparing and rewriting control circuit 66 shown in FIG. 10 includes a plurality of 1 bit comparing and rewriting circuits 260. Each 1 bit comparing and rewriting circuit 260 is connected to a corresponding one of the first bit line 100, the corresponding one of the second bit line 102, and the corresponding one of the external data line 98, respectively. Comparing and rewriting signal line 84 includes an external data write signal line 264, a rewrite signal line 266 and a clock signal line 268, all of which are connected to every 1 bit comparing and rewriting circuit 260. In comparing and rewriting control circuit 66, a data selecting signal line 262 is formed folded at the right end of the comparing and rewriting control circuit 66, and hence it is twice connected to every 1 bit comparing and rewriting circuit 260.

Figure 22:
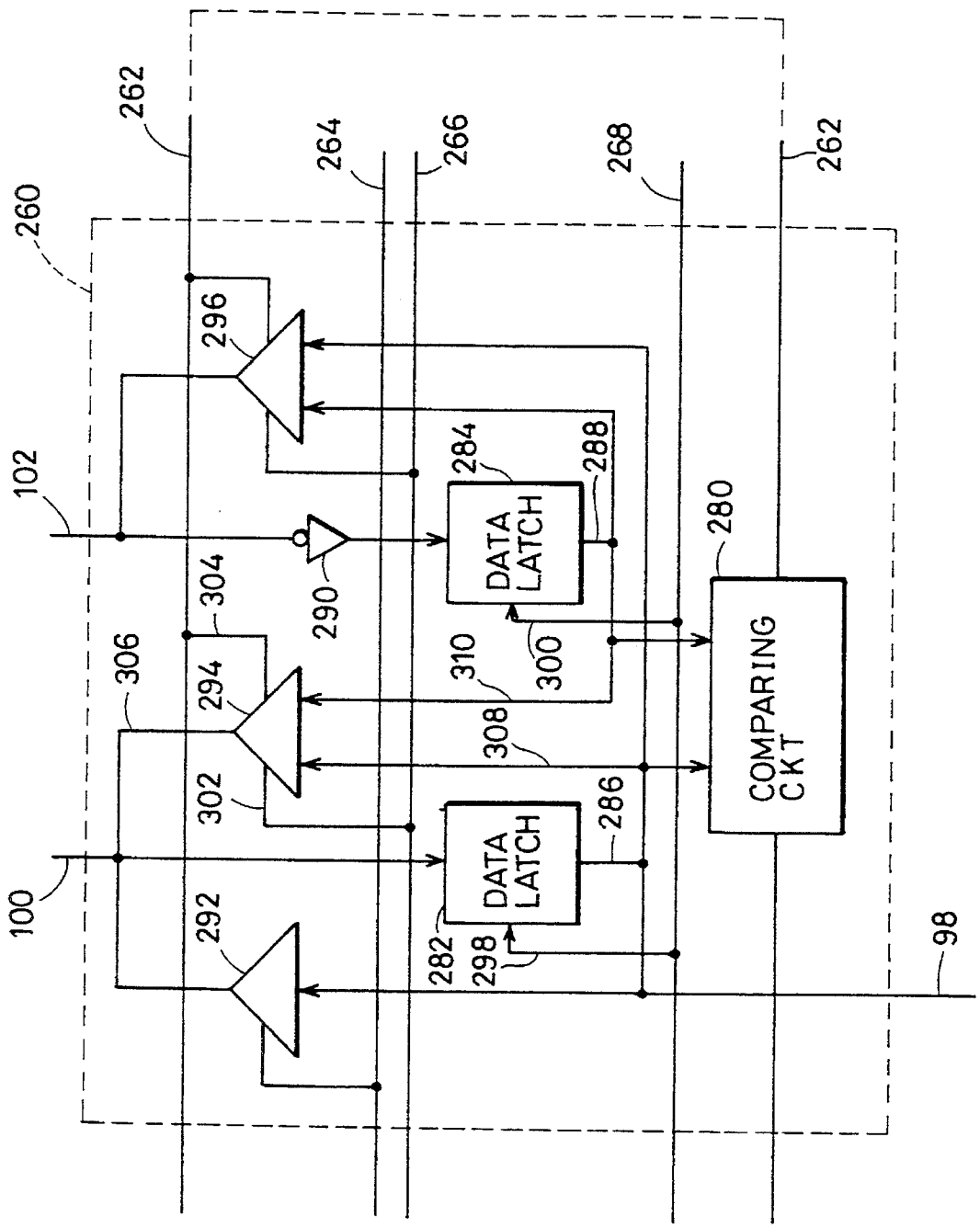
FIG. 22 is a block diagram of a 1 bit comparing and rewriting control circuit.

FIG. 22 is a block diagram of 1 bit comparing and rewriting circuit 260. 1 bit comparing and rewriting circuit 260 includes a comparing circuit 280, two data latch circuits 282 and 284, an external data writing circuit 292, data rewriting circuits 294 and 296, and an NOT circuit 290.

Data latch circuit 282 has its input connected to the first bit line 100 and its output connected to read data line 286. Data latch circuit 284 has its input connected to the second bit line 102 through NOT circuit 290, and its output connected to read data line 288. Read data line 286 is connected to external data line 98, and external data line 98 is connected to an input of external data write circuit 292. Further, external data line 98 is connected to one input of data rewriting circuit 294 through data line 308. Read data line 286 is further connected to one input of data rewriting circuit 296.

Read data line 288 is connected to the other input of data rewriting circuit 294 through data line 310. Read data line 288 is further connected to the other input of the other data rewriting circuit 296. Clock signal line 298 branches to clock signal branch lines 298 and 300 in 1 bit comparing and rewriting circuit 260, and applies clock signals to data latch circuits 282 and 284, respectively.

Comparing circuit 280 is connected to data selection signal line 262, and has two input terminals. One input terminal is connected to read data line 286 of data latch circuit 282. The other input terminal of comparing circuit 280 is connected to read data line 288 of data latch circuit 284. The structure of comparing circuit 280 is similar to that of comparing circuit 114 shown in FIGS. 16 and 17.

An output of external data write circuit 292 is connected to the first bit line 100. A write signal is applied from external data write signal line 264 to external data write circuit 192.

An output of data writing circuit 294 is connected to the first bit line 100 through output signal line 306. To data rewriting circuit 294, signals are applied from rewrite signal line 266 and the folded data selecting signal line 262, through a rewrite signal branch line 302 and a data selection signal branch line 304, respectively.

Data rewriting circuit 296 has its output connected to the second bit line 102. Data rewriting circuit 266 is also connected to the folded data selection signal line 262 and to rewrite signal line 266.

Figure 23:
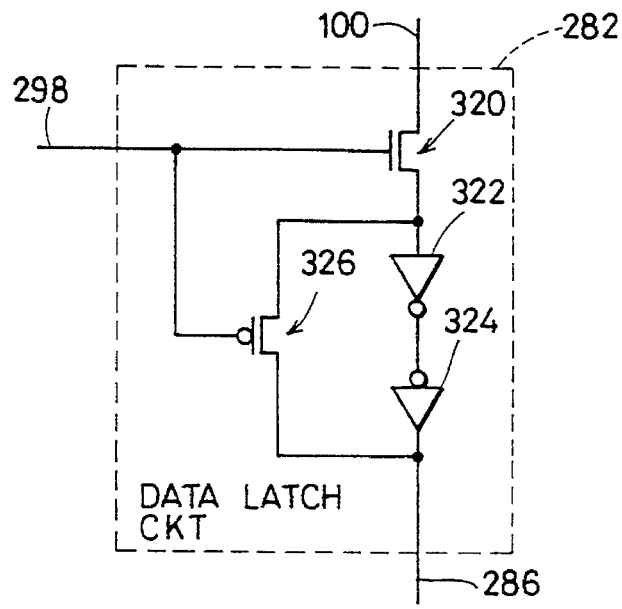
FIG. 23 is a schematic diagram of a data latch circuit.

Data latch circuits 282 and 284 have identical structure. Referring to FIG. 23, data latch circuit 282, for example, includes an n channel transistor 320, series-connected NOT circuits 322 and 324, and a p channel transistor 326.

Transistor 320 has one input/output terminal connected to the first bit line 100, and the other input/output terminal connected to an input of NOT circuit 322. Transistor 320 has its gate electrode connected to a clock signal branch line 298. The output of NOT circuit 324 is connected to read data line 286. Transistor 326 has two input/output terminals connected to an input of NOT circuit 322 and to the output of NOT circuit 324, respectively. Transistor 326 has its gate electrode connected to clock signal branch line 298.

As can be readily understood from FIG. 23, data of bit line 100 is input to data latch circuit 282, when the clock signal branch line 298 assumes logic 1, and the data is latched in data latch circuit 282 when the clock signal assumes logic 0.

Figure 24:
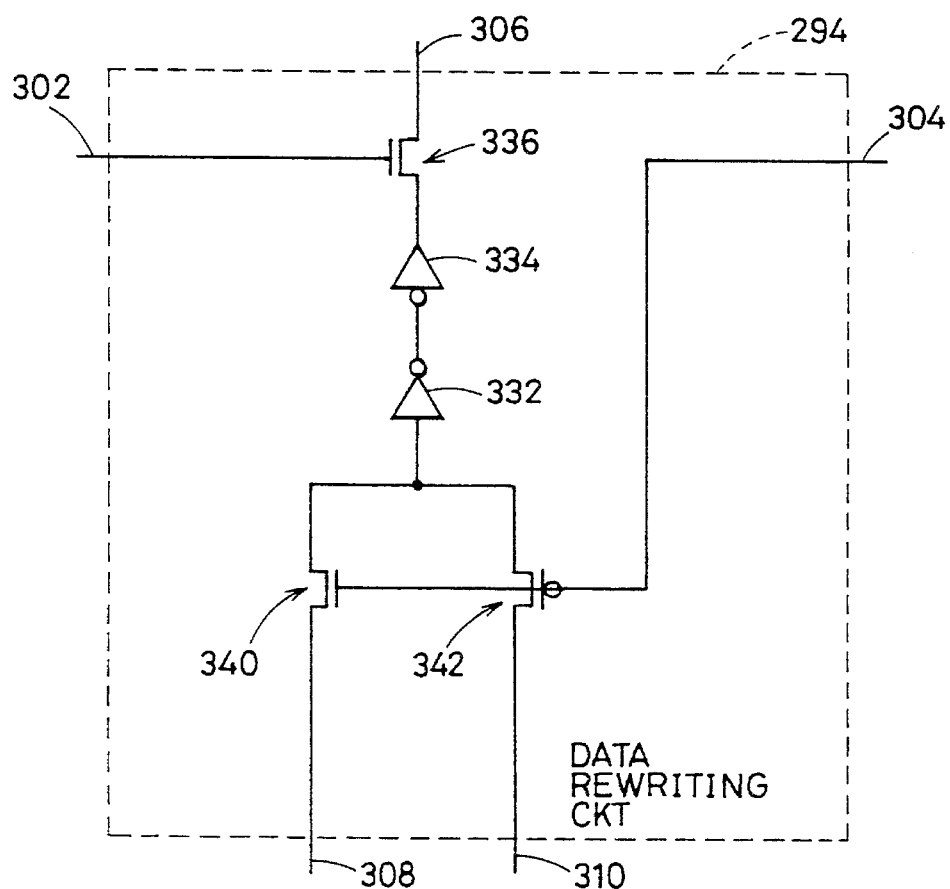
FIG. 24 is a schematic diagram of a data rewriting circuit.

Data rewriting circuits 294 and 296 shown in FIG. 22 have identical structure. Referring to FIG. 24, data rewriting circuit 294, for example, includes n channel transistors 336 and 340, a p channel transistor 342, and NOT circuits 332 and 334.

Transistors 340 and 342 are respectively connected to data lines 308 and 310, each at one input/output terminal. Transistors 340 and 342 have their gate electrodes commonly connected to data selection signal branch line 304. The other input/output terminal of transistor 340 and the other input/output terminal of transistor 342 are commonly connected to an input of NOT circuit 332.

NOT circuit 332 has its output connected to an input of NOT circuit 334, and NOT circuit 334 has its output connected to one input/output terminal of transistor 336. Transistor 336 has the other input/output terminal connected to output signal line 306 and its gate electrode connected to rewrite signal branch line 302.

Figure 25:
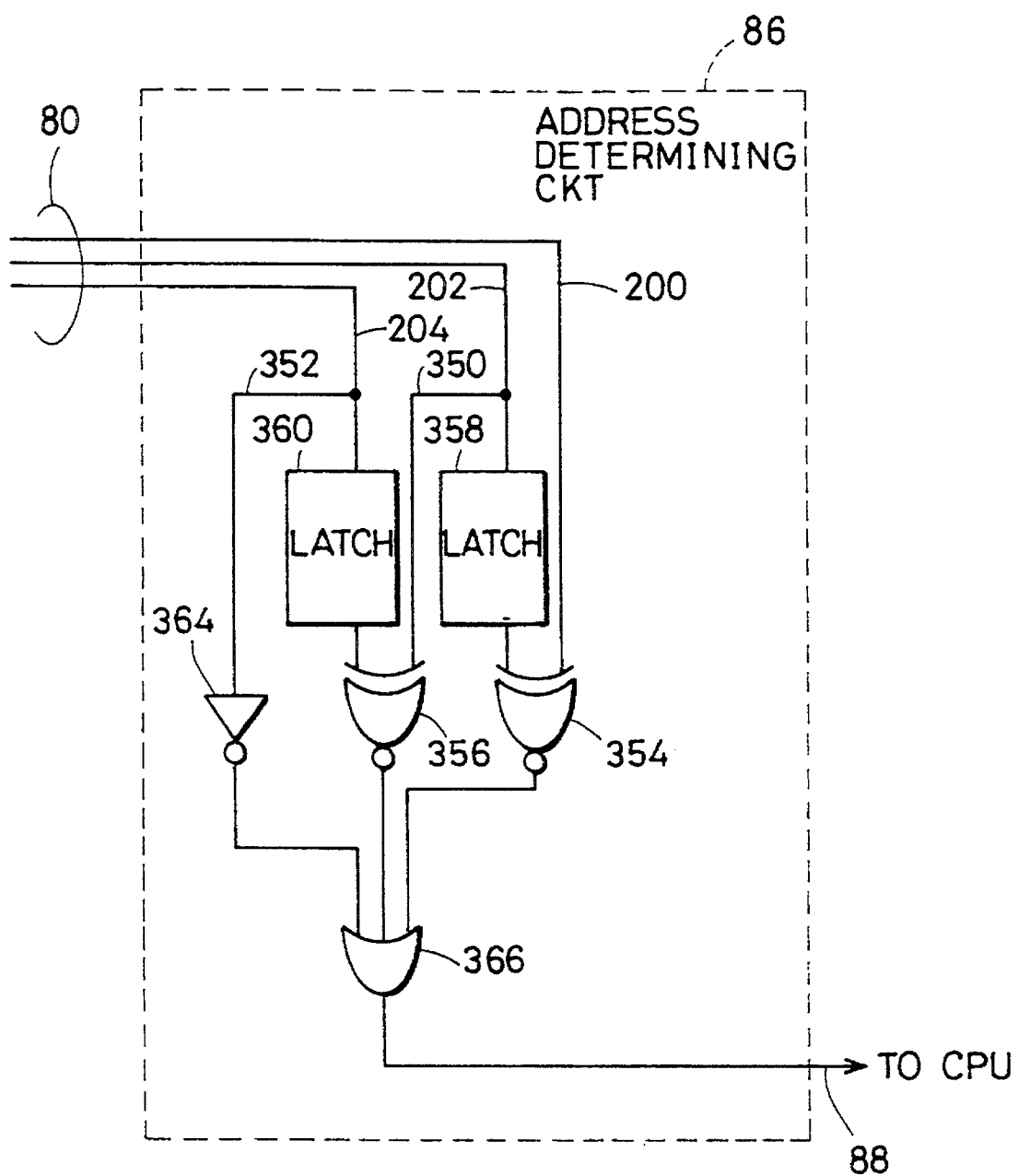
FIG. 25 is a block diagram of an address determining circuit.

FIG. 25 is a block diagram of address determining circuit 86 shown in FIG. 10. Referring to FIG. 25, address determining circuit 86 includes two data latch circuits 358 and 360, two exclusive NOR circuits 354 and 356, a NOT circuit 364, and an OR circuit 366. For simplicity, an address signal is represented as having three bits in this embodiment. However, actually, larger number of bits are used, and therefore the number of necessary latch circuits and the like increase according to the number of bits.

In address determining circuit 86, the first bit line 202 branches to address branch line 350. The second bit line 204 branches to address branch line 352.

The first bit line 202 is connected to an input of data latch circuit 351, and the output of data latch circuit 358 is connected to one input of exclusive NOR circuit 354. The other input of exclusive NOR circuit 354 is connected to the 0th bit line 200.

The second bit line 204 is connected to an input of data latch circuit 360, and the output of data latch circuit 360 is connected to one input of exclusive NOR circuit 356. Address branch line 350 is connected to the other input of exclusive NOR circuit 356.

Address branch line 352 is connected to an input of NOT circuit 364. Outputs from exclusive NOR circuits 354 and 356 and of NOT circuit 364 are connected to corresponding inputs of OR circuit 366. The output of OR circuit 366 is connected to wait signal line 88.

The function of address determining circuit 86 is as follows. In latch circuits 360 and 358, the second bit and the first bit of the address signal applied in the immediately preceding operation cycle are stored. These second bit and the first bit are compared with the first bit and the 0th bit of the address signal applied in the next operation cycle in exclusive NOR circuits 356 and 354, respectively. If the second bit of the previous operation cycle coincides with the first bit of the present cycle, the output of exclusive NOR circuit 356 assumes logic 1, and otherwise it assumes logic 0. Similarly, if the first bit of the preceding cycle coincides with the 0th bit of the present cycle, the output of exclusive NOR circuit 354 assumes logic 1, otherwise logic 0. If the second bit of the address signal applied this time is logic 1, the output of NOT circuit 364 assumes logic 0, otherwise it assumes logic 1.

Namely, when most significant 2 bits of the address signal applied in the immediately preceding operation cycle coincide with the least significant 2 bits of the address signal applied at this time, and the most significant 1 bit of the presently applied address signal is 0, address determining circuit 86 provides a wait signal of logic 1 to wait signal line 88, and otherwise provides a signal of logic 0 to wait signal line 88. More specifically, address determining circuit 86 determines whether or not the present address is equal to ½ of the previously applied address, and if it is, provides a wait signal of logic 1.

FIG. 26 shows, in a table, the operation of address determining circuit 86. In the example shown in FIG. 26, it is assumed that a signal including not 3 bits but 6 bits is applied as an address. Referring to FIG. 26, if the immediately preceding data is "110110" in binary notation, the value divided by two is "011011" in binary notation. Therefore, if the present data is "011011" in binary notation, the wait signal will be logic 1. Similarly, if the immediately preceding data is "110111" in binary notation and the present address data is "011011" in binary notation, a wait signal is also generated. The meaning of this wait signal will be discussed in greater detail with reference to the operation of this unit.

The processor circuit of the first embodiment operates in the following manner. As already described, the processor circuit is for generating heap data. In each step of the algorithm for generating heap data described above, which node is to be processed, that is, which macro cell should be regarded as the parent node of interest, is determined in accordance with the algorithm on the side of the CPU, which is not shown.

Referring to FIG. 10, it is assumed that data for generating heap data has been prestored in memory 54. Initial data are set in respective macro cells 70 (FIG. 10), 110 and 112 (FIG. 11) of memory cell 64 by the following process.

At first, the CPU applies an address signal for selecting macro cell 70 shown in FIG. 10 to the first decoder 60 through address signal line 80. First decoder 60 activates selection signal line 90 and connects macro cell 70 to first bit line 100. Meanwhile, the CPU applies a control signal to memory 54 through memory control signal line 82, so that data at a prescribed address of memory 54 is output to external data line 98.

Referring to FIG. 22, as the CPU applies external data latch signal 264, external data write circuit 292 provides data from external data line 98 to the first bit line 100. The data is written to macro cell 70 shown in FIG. 10. This writing is performed for every bit of the data.

The same applies to other macro cells. More specifically, the CPU applies an address signal of the macro cell which is to be next selected to decoder 60, and decoder 60 selects the macro cell and connects the same to bit line 100. Data to be written is provided from memory 54 to external data line 98, and through comparing and rewriting control circuit 66, the data is written to a desired macro cell. This process is repeated for every data of interest, so that data of interest are all stored in memory cell array 64.

By programming of the CPU, not shown, the process of step S1 of the algorithm for generating heap data described above is performed. More specifically, a first node having a child (children) is found. Consequently, the address of the macro cell corresponding to that node is specified. This macro cell is determined based on the number of data to be processed.

A process for making heap the binary tree below that node which has been found in step S1 is performed. The specific manner of this process is as follows.

Referring to FIG. 11, in every macro cell pair 72, comparing circuit 114 compares the data stored in the first macro cell 110 with the data stored in the second macro cell 112, and provides a comparison determination signal to comparison determination signal line 126. The comparison determination signal will be described.

Referring to FIG. 17, assume that the signal on data line 118 is logic 1 while the signal on data line 120 is logic 0. In this example, transistors 172 and 174 are both off and transistors 170 and 178 are both on. Therefore the potential on line 164 is at the ground potential (L level).

On the contrary, assume that the signal on data line 120 is logic 1 and the signal on data line 118 is logic 0. In that case, transistors 172 and 174 are both on, while transistors 176 and 178 are both off. Therefore, the potential on line 164 is at the supply potential (H level).

Assume that the signals on data lines 118 and 120 are of the same level. At this time, either one of the transistors 172 and 174, and either one of the transistors 176 and 178 will be off without fail. Transmission gate 182 turns on, and the potential of line 164 on the left side and on the right side of transmission gate 182 will be the same.

As shown in FIGS. 16 and 17, the leftmost end of line 164 (on the side of the least significant bit) is connected to the ground potential. Referring to FIG. 16, in a certain 1 bit data comparing circuit 160, when the signal on data line 118 is larger than the signal on data line 120, the potential of lines 164 is determined by that 1 bit data comparing circuit 160 on the right side thereof, regardless of the result of comparison by the 1 bit data comparing circuits on the left side thereof. Further, in said certain 1 bit data comparing circuit 160, when the signal on data line 118 has the same value as the signal on data line 120, the potential on line 164 will be the same on the left and right sides of the 1 bit data comparing circuit 160.

Figure 1:
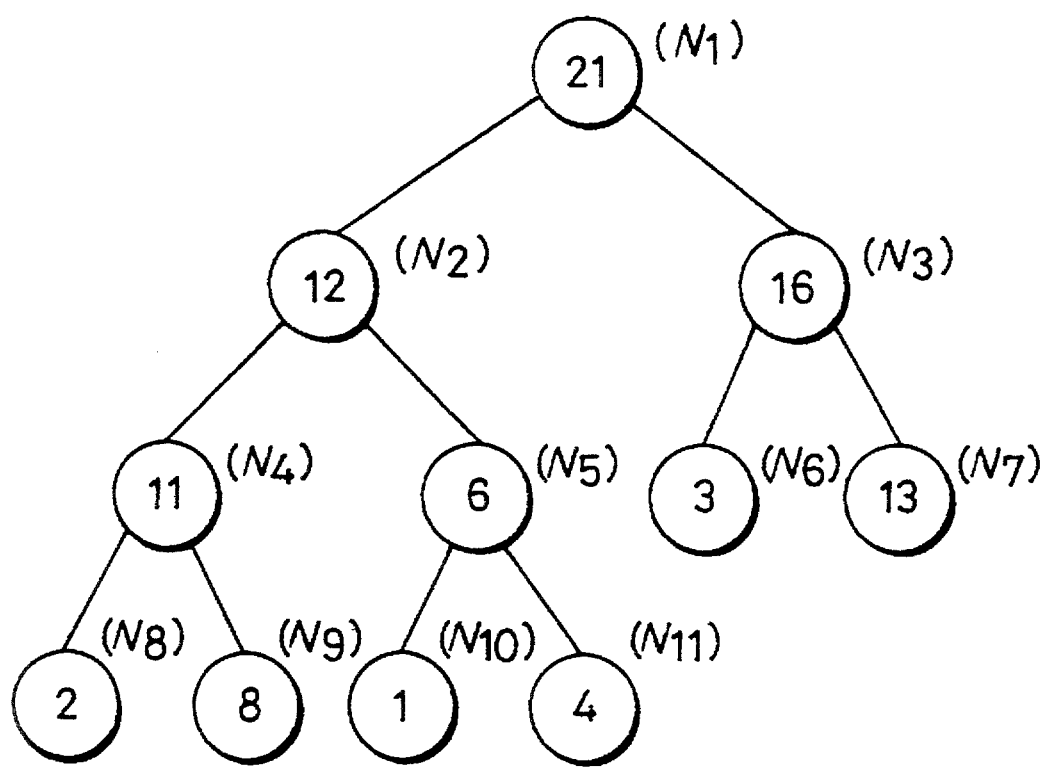
FIG. 1 is a schematic diagram showing heap data.
Figure 2:
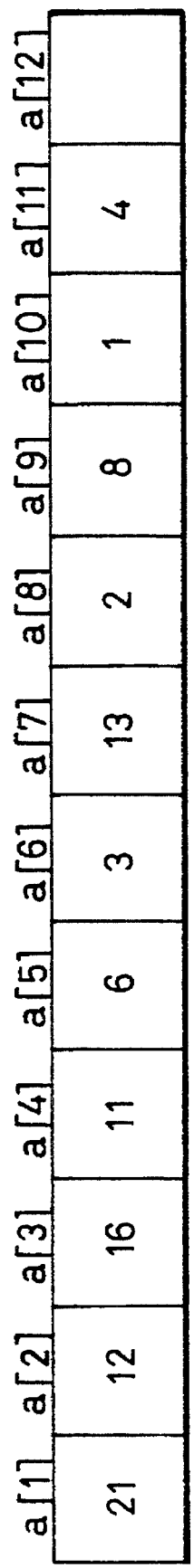
FIG. 2 is a schematic diagram showing a one dimensional array.

Here, let us assume that in 1 bit data comparing circuit 160 of the most significant bit (rightmost one of FIG. 1), the data on data line 118 is larger than the data on data line 120. In this case, the potential on line 164 on the right side thereof attains to the ground level (L level), and therefore an H level appears on the comparison determination signal line 126. By contrast, if the data on data line 118 is smaller than the data on data line 120, the line 164 attains to the power supply potential (H level), and L level appears on comparison determination signal line 126. If both data are the same, the potential on line 164 is determined by the result of comparison in the next 1 bit data comparing circuit on the left side. If the result of comparison in this circuit is also the same, the potential is determined by the result of comparison in the second next circuit on the left side.

If all the bits on data lines 118 and 120 are the same, the potential on line 164 will be the ground potential. Therefore, when the data on data line 118 (that is, the data stored in macro cell 110 of FIG. 11) is equal to or larger than the data on second data line 120 (that is, data stored in macro cell 112 of FIG. 11), comparing circuit 114 provides an H level comparison determination signal and otherwise an L level comparison determination signal to macro cell selecting circuit 116 shown in FIGS. 11 and 12.

It should be noted that comparing circuit 114 constantly compares the data in macro cells 110 and 112 and provides comparison determination signal, independent from the control by the CPU. Accordingly, a special process for determining which of the data in a pair of macro cells 110 and 112 is larger becomes unnecessary in the CPU, and therefore the process for generating heap data can be performed at higher speed.

Again, referring to FIG. 10, assume that the CPU has applied an address of the node of interest to address signal line 80. Decoder 60 selects the macro cell specified by the address signal, and connects the macro cell to first bit line 100. Meanwhile, decoder 62 selects a macro cell pair 72 in accordance with the relation shown in FIG. 20, and applies to macro cell selecting circuit 116 (see FIGS. 11 and 12) of the macro cell pair 72, an H level selection signal through address decode signal line 96.

Referring to FIG. 12, when the signal on comparison determination signal line 126 is at the H level, macro cell selecting circuit 116 sets selection signal line 122 to the H level, and selection signal line 124 to the L level. Accordingly, macro cell 110 (see FIG. 11) is selected and connected to the second bit line 102.

If the comparison determination signal line 126 is at the L level, macro cell selecting circuit 116 applies an L level signal to selection signal line 122 and an H level signal to selection signal line 124, respectively. Thus macro cell 112 shown in FIG. 11 is connected to the second bit line 102. In any case, of the pair of macro cells 110 and 112 (see FIG. 11) included in the macro cell pair 72 selected by the second decoder 62 (FIG. 10), one storing larger data is selected and connected to the second bit line 102. This process corresponds to the operation of "selecting larger one of the two children of a parent" in generating heap data.

Referring to FIG. 21, the data selected by the first decoder 62 is applied to respective 1 bit comparing and rewriting circuits 260 through first bit line 100. The data of the macro cell selected by the second decoder 62 is applied to respective 1 bit comparing and rewriting circuits 260 through the second bit line 102.

Referring to FIG. 22, data latch circuits 282 and 284 latch the data on the bit lines 100 and 102 in response to an applied clock signal, and apply the data to comparing circuit 280 through read data lines 286 and 288, respectively.

Comparing circuit 280 has completely identical structure as 1 bit data comparing circuit 160 shown in FIG. 17, and when two data applied thereto are the same, it renders conductive the data selection signal line 262 on the left and right sides thereof. When data from data latch circuit 282 is logic 1 and the data applied from data latch circuit 284 is logic 0, it sets the potential on data selection signal line 262 on the right side to logic 1, and if the logics are reversed, sets the data selection signal line 262 on the right side to logic 0.

Since comparing circuit 280 is provided for every bit, when the data selected by the first decoder 60 is larger than the data selected by the second decoder 62 and the macro cell selecting circuit 116, it provides data selection signal of logic 1, and otherwise it provides a data selection signal of logic 0. This data selection signal is applied to data rewriting circuits 294 and 296.

For example, referring to FIG. 24, when the data selection signal applied from data selection signal branch line 304 is logic 1, data rewriting circuit 294 selects the data on data line 308, and in the reverse case, selects the data on data line 310, and provides the selected data to output signal lines 306 in response to a rewrite signal applied through rewrite signal branch line 302. Therefore, if the data rewrite signal is logic 1, the output of data latch circuit 282 shown in FIG. 22 is again provided to the first bit line 100, and if it is logic 0, the output of data latch circuit 284 is provided to the first bit line 100.

The process carried out in data rewriting circuit 296 is similar, in which if the data rewrite signal is logic 1, the output from data latch circuit 284 is provided to the second bit line 102, and if it is logic 0, the output of data latch circuit 282 is provided to the second bit line 102.

More specifically, the content of the first macro cell selected by the first decoder is compared with the content of the second macro cell which is selected by the second decoder 62, macro cell selecting circuit 116 and comparing circuit 114. If the content of the first macro cell is larger, the data is re-written to respective macro cells as they are. If the content of the first macro cell is smaller, the data are exchanged and written to respective macro cells.

Therefore, when the heapsort processor in accordance with the first embodiment is used, comparison/exchange of the data of the parent and children can be automatically performed as needed, simply by inputting an address value of the node of interest to address signal line 80, and by applying signals at a desired timing, on the write signal line 266 and clock signal line 268. In this example, it is not necessary to perform the operation of selecting larger one of two children of a parent in the program of the CPU, and when an address signal is applied, the process circuit selects the larger one automatically.

Therefore, according to the processor circuit of the first embodiment, simply by storing externally applied data to be processed in macro cells and by successively selecting nodes in such an order as described in the prior art, heap data can be generated in order in the macro cells of the memory cell array. Since comparison between data of two children of a parent is automatically performed by the processor circuit as mentioned above, generation of heap data can be done extremely easily. Further, once data are stored, comparison between children is automatically executed by the hardware, and therefore as compared with the example in which data of children are compared by software, the speed of operation is far faster. Even when data of a child is rewritten, comparison between children is performed substantially parallel to the execution of data rewriting operation of other parent and children, time is not wasted in the operation of this heapsort processor.

However, it must be recognized that the heapsort processor of the first embodiment has the following disadvantage. There is a possibility that the parent data is rewritten in accordance with the result of comparison with the data of each children. If the data is rewritten, magnitude thereof is compared with the data stored in an adjacent macro cell. Dependent on the result of comparison, the result of selection between adjacent macro cells may possibly differ. Rewriting of data and comparison between the rewritten macro cell and the data of the adjacent macro cell require some period of time.

Generally, the re-written macro cell or the macro cell adjacent to the rewritten macro cell will not be immediately referred to as the child data. Parallel to the data processing between other parent and children, data of children are compared with each other, and by the time the data processing of other parent and children is completed, a stable comparison output will be obtained. This is because the time necessary for comparing the data of the parent and children is the same as the time necessary for comparing data of the children to each other. Therefore, in such a normal operation, the time necessary for comparing the re-written macro cell with the adjacent macro cell is not visible.

However, the rewritten macro cell or the macro cell adjacent thereto may be referred to as the child data in the succeeding process. In such a case, the comparison between the rewritten macro cell and the adjacent macro cell may have not yet been completed. The result of comparison is not reliable. Therefore, if these two macro cells are selected and one of these is further selected by the comparison thereof and the selected data is read, the data cannot be said to be truly correct result.

Such disadvantage occurs when the data selected as parent immediately before is read as child data in the next process. Therefore, if there is not an address determining circuit 86 such as shown in FIG. 25, the external CPU must constantly monitor the address data which it provides to the processor circuit, so as to prevent the above described problem.

However, address determining circuit 86 shown in FIG. 25 constantly monitors whether such a relation that causes the above described disadvantage holds between the addresses applied in continuous two processors. If such disadvantage is expected, it generates a wait signal and applies the same to the CPU.

Therefore, it is not necessary for the CPU to monitor whether such a problem should occur with respect to the address signals provided therefrom, and what is necessary is only to monitor the value of the wait signal.

If the wait signal is logic 1, there is a possibility that the result of comparison of the present cycle is contradictory. In that case, the process in the operation cycle is neglected, and the data of the same address may be applied to the processor circuit in the next operation cycle.

Second Embodiment

FIGS. 27 and 28 show a heapsort processor 370 which is a processor circuit in accordance with the second embodiment of the present invention. Different from the first embodiment, heapsort processor 370 of the second embodiment has not only the function of generating heap data but also the function of executing, by means of hardware, part of the algorithm for subsequent heapsorting.

Heapsort processor 370 of the second embodiment differs from heapsort processor 50 of the first embodiment shown in FIG. 10 in that of two selection signal lines for selecting macro cell 70, a selection signal line on the different side than selection signal line 90 is connected to an external mode designation signal line 378, and that in place of the second decoder 62 shown in FIG. 10, a decoder 370 is included, which is connected to mode designating signal branch line 380 branching from mode designation signal line 378 and enabled or disabled in response to a mode designating signal.

In the second embodiment, address determining circuit 86 included in the first embodiment is omitted. It should be understood that it may include address determining circuit 86. As for address signal line 80, only the 0th bit line and the first bit line are connected to decoder 374 as address signal lines 382.

Referring to FIG. 28, decoder 374 includes, instead of three 2-input AND circuits 248, 250 and 252 shown in FIG. 19, three 3-input AND circuits 392, 394 and 396, and an NOT circuit 390 having one input connected to mode designating signal branch line 380. Connection between two inputs of each of AND circuits 392, 294 and 396 and 0th bit line 200, first bit line 202 and designating circuits 244 and 246 is similar to that shown in FIG. 19. Third input of each of AND circuits 392, 394 and 396 is connected to the output of NOT circuit 390.

In FIG. 28, portions corresponding to those of FIG. 19 are denoted by the same reference characters and referred to by the same names. Detailed description thereof is not repeated here.

Memory cell array 372 of the second embodiment differs from memory cell array 64 of the first embodiment shown in FIG. 10 only in that one selection signal line of macro cell 70 is connected to mode designating signal line 378. In FIG. 27, portions corresponding to those shown in FIG. 10 are denoted by the same reference characters and detailed description thereof is not repeated here.

Heapsort processor 370 of the second embodiment operates in the following manner.

As already described, the first step of heapsorting is to generate heap data in a plurality of macro cells in memory cell array 372. This process is performed basically in the same manner as described in the first embodiment.

(S1) First, an external CPU, not shown, applies logic 0 to mode designating signal line 378. Similar to the first embodiment shown in FIG. 10, macro cell 70 is set to the same state as connected to the ground potential. Referring to FIG. 28, the output of NOT circuit 390 attains to logic 1. Therefore, AND circuits 392, 394 and 396 operate in the completely same manner as three AND circuits 248, 250 and 252 shown in FIG. 19. Namely, decoder 374 is enabled.

Therefore, by applying a logic 0 signal externally through mode designating signal line 378, heapsort processor 370 shown in FIG. 27 performs the same operation as the heapsort processor of the first embodiment. In this case, since address determining circuit 86 is not provided in the second embodiment, it is necessary for the external CPU to monitor the value of the address signal applied to address signal line 80 so as to prevent such a disadvantage as described in the first embodiment.

Figure 3:
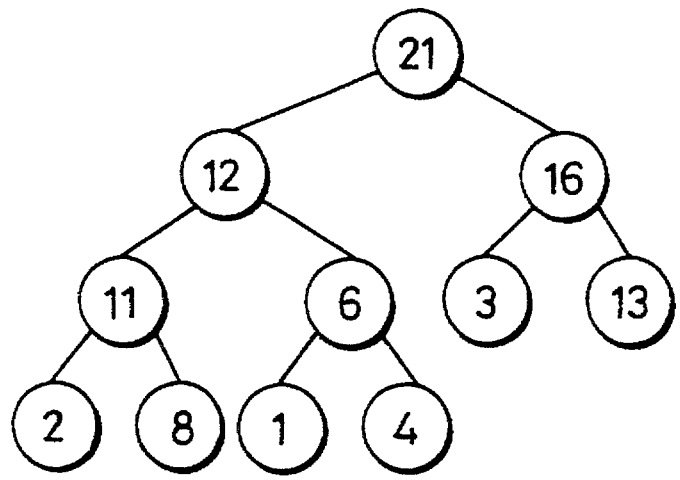
FIG. 3 is a schematic diagram showing heap data.
Figure 4:
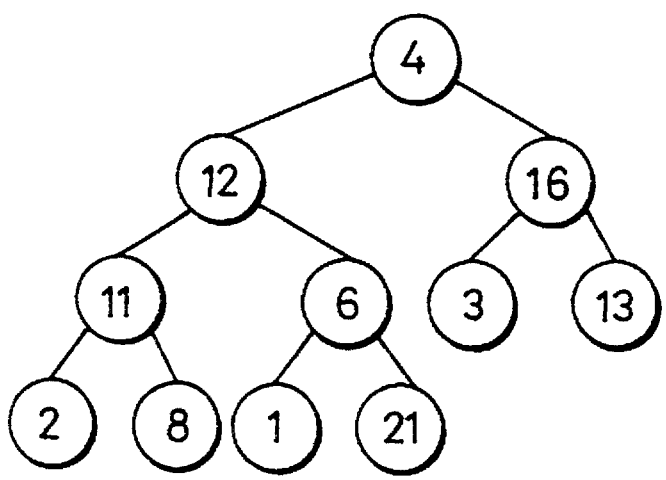
FIGS. 4 to 8 are schematic diagrams showing processes of heapsort.
Figure 5:
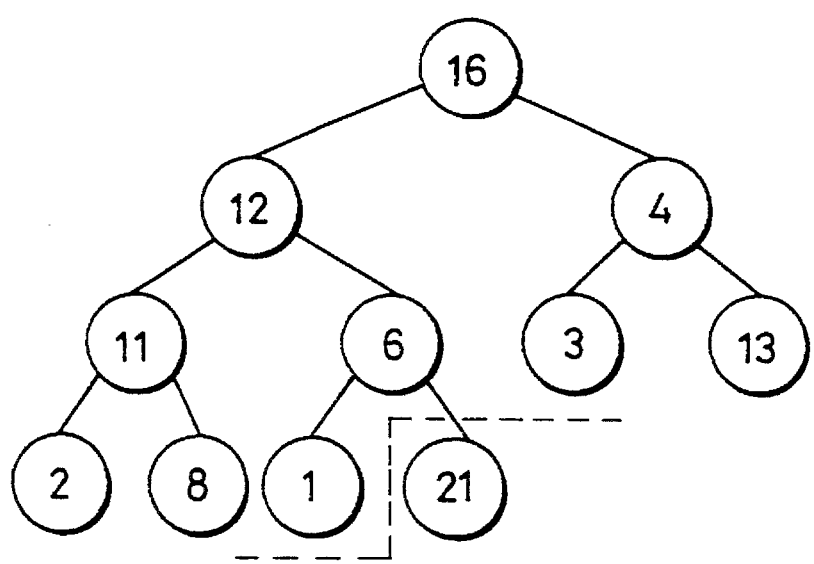
Figure 6:
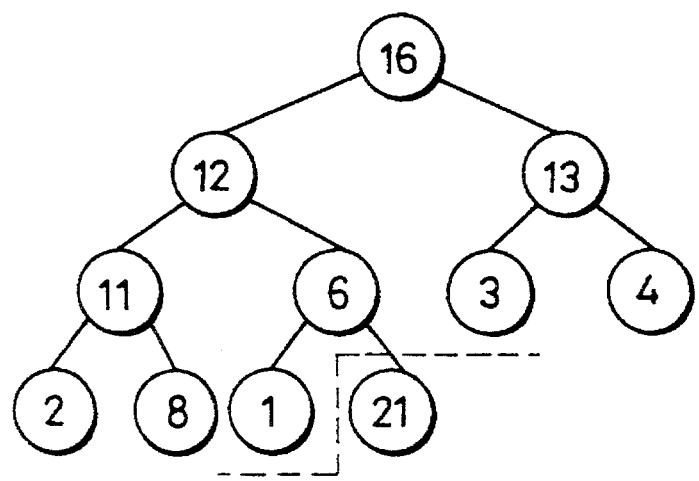
Figure 7:
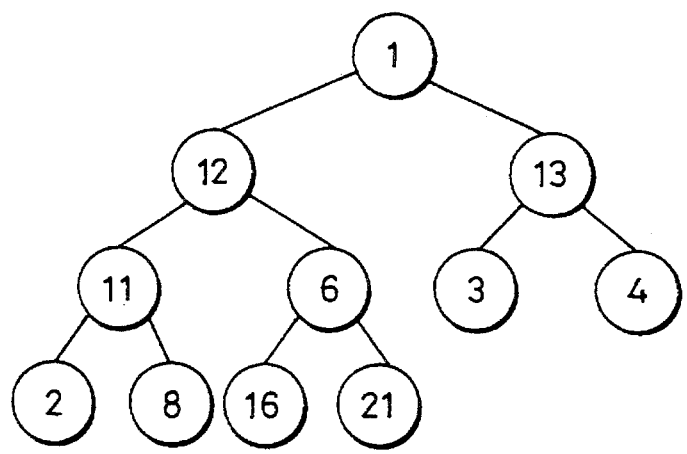
Figure 8:
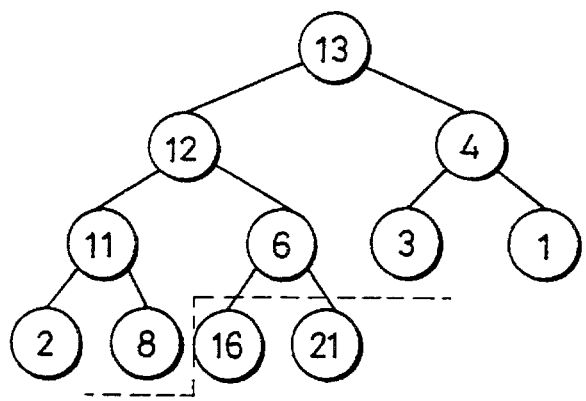
Figure 9:
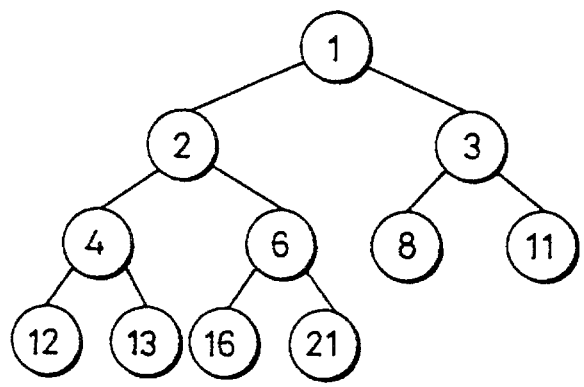
FIG. 9 is a schematic diagram showing sorted data.

(S2) Assume that heap data are generated in the macro cells of memory cell array 372 in the first step described above. The next step for heapsort is to exchange the last one of the heap data for the root (see FIGS. 1 and 3) and again make heap the data except the exchanged last data (see FIGS. 4 and 5).

For this process, the mode designating signal applied to mode designating signal line 378 is set to logic 1. Referring to FIG. 28, the output of NOT circuit 390 is fixed to logic 0. Outputs from AND circuits 392, 394 and 396 are all fixed at logic 0. Namely, when mode designating signal is logic 1, any macro cell pair 72 shown in FIG. 27 is not selected. Decoder 374 is disabled.

Meanwhile, the selection signal applied from mode designating signal line 378 to macro cell 70 will be logic 1. Therefore, in this case, macro cell 70 is selected and connected to bit line 102.

(S3) Meanwhile, to address signal line 80, a value indicating the number of data n to be sorted is applied. This is decoded by decoder 60, and corresponding selection signal line 92 or 94 is activated. Thus nth macro cell 110 or 112 (see FIG. 11) is selected and connected to the first bit line 100.

In this manner, the data read from the first macro cell is read to the second bit line 102 and the data read from the nth macro cell is read to the first bit line 100, respectively. In the similar manner as in the formation of heap data, comparing and rewriting control circuit 66 compares these two data, and when the data on the second bit line 102 is larger than the data on the first bit line 100, exchanges these data and writes these data to original macro cells.

As already described, the data stored in the macro cells of the memory cell array 372 are heap data. Therefore, as can be seen from FIG. 1, the data stored in the first macro cell (root) is larger than the nth data (last data). In the operation of this step, the data is always exchanged, and the data of the first macro cell is written to the nth macro cell, and the data of the nth macro cell is written to the first macro cell, respectively.

By the above described process, of n data to be processed, the largest one is stored in the nth macro cell.

Then, a process for making heap (n−1) data except the nth data is performed. This process is performed in the following manner.

The mode designating signal which is to be applied to mode designating signal line 378 is set to logic 0. Thus decoder 374 is enabled.

As the decoder 374 is enabled, (n−1) data stored in memory cell array 372 can be made heap in accordance with the method already described above.

(S4) The processes of the steps S2 and S3 above are repeated until the data to be processed becomes only one. Selection of the mode designating signal and of the address signal is performed by the CPU, not shown, in accordance with a prescribed algorithm.

By the time the execution of steps S1 to S4 is completed, the data are sorted and stored in the ascending order from the first macro cell 70 to nth macro cell of the memory cell array 372. Namely, sorting of data in accordance with the heapsort algorithm has been completed. After the completion of sorting, by applying address signals to address signal line 80 designating macro cells starting from the first one, data can be read in the ascending order to the first bit line 100. On the contrary, by applying address signals to the heapsort processor 370 for selecting the macro cells starting from the nth macro cell to the first macro cell, the data can be read to the bit line 100 in a descending order.

In the second embodiment, when the data of the first macro cell is exchanged for the last data to be processed, the comparing and rewriting control circuit 66 used for generating heap data is utilized. However, the present invention is not limited to this example, and a circuit different from the comparing and rewriting control circuit for generating the heap data may be used. Further, at that time, comparison and rewriting may be performed by using a different address decode circuit or a different bit line.

In the second embodiment, similar to the first embodiment, heap data are generated and then, by applying a mode designating signal and an address signal in accordance with a prescribed algorithm, heapsort can be implemented. Since operations such as comparison and rewriting of data can be performed by not the software but by the hardware, heapsorting can be done at extremely high speed.

During heapsorting, it is necessary to repeat the process for generating heap data. However, since comparison between data of children is constantly performed by means of a hardware, the process for generating heap data can be done far faster than when it is done by a software. Therefore, the speed for the overall heapsorting can be remarkably improved as compared with the example in which the overall processing is done only by the software. Further, there is an additional advantage that the program for controlling heapsort is relatively simple.

Third Embodiment

FIG. 29 shows a heapsort processor 400 in accordance with the third embodiment of the present invention. The heapsort processor 400 of the third embodiment differs from heapsort processor 370 (see FIG. 27) of the second embodiment in that it includes, instead of memory cell array 372, a memory cell array 402, and further in that it includes a data latch circuit 404 connected to an external data output line 406.

Referring to FIG. 29, memory cell array 402 differs from memory cell array 372 shown in FIG. 27 in that it includes a macro cell 410 connected to data latch circuit 404 through data line 408. Further, macro cell 410 is different from the macro cell 70 of the second embodiment shown in FIG. 27 only in that it is connected to data line 408. Except these points, macro cell 410 is the same as macro cell 70 shown in FIGS. 10 and 27. The structure of macro cell 410 itself is identical with the macro cell 110 or 112 of the first embodiment shown in FIGS. 13 to 15, for example. Therefore, the structure of macro cell 410 is not described in greater detailed herein.

In FIG. 29, portions corresponding to those of FIGS. 10 and 27 are denoted by the same reference characters and referred to similarly. The function of these portions are also similar.

Operation of heapsort processor 400 of the third embodiment is basically the same as that of heapsort processor 370 (see FIG. 27) of the second embodiment. However, provision of data latch circuit 404 allows the following operation.

When the signal on mode designating signal line 378 is logic 0, data in memory cell array 402 have been sorted into the heap data. At this time, the first macro cell 410 stores the largest one of the data which is re-sorted to a heap state. At this time, the content stored in macro cell 410 is copied in data latch circuit 404 through data line 408.

Meanwhile, if the signal on mode designating signal line 378 is logic 1, the data in macro cell 410 is not copied in data latch circuit 404. Therefore, when mode designating signal is logic 1 and the content stored in data latch circuit 404 at this time is read through data output line 406, the data of the macro cell 410 immediately before the change of mode designating signal to logic 1 can be read.

As described above, data stored in macro cell 410 changes in order starting from larger one to smaller one during heapsorting. Therefore, when content stored in data latch circuit 404 is read while the mode designating signal is logic 1, data can be read in order starting from larger one to smaller one. By the time heapsorting is completed, the last smallest data is stored in macro cell 410, and this data can be read simultaneously with the completion of heapsorting. Compared with the second embodiment in which all data are read after the completion of heapsort, this embodiment is advantageous as all results can be obtained simultaneously with the completion of sorting.

Fourth Embodiment

A heapsort processor which is a processor circuit in accordance with the fourth embodiment of the present invention is shown in FIGS. 30 to 33. In addition to the function of the heapsort processor of the third embodiment (FIG. 29), the heapsort processor in accordance with the fourth embodiment further has an advantage that heapsorting can be performed both in the ascending order and the descending order.

Figure 30:
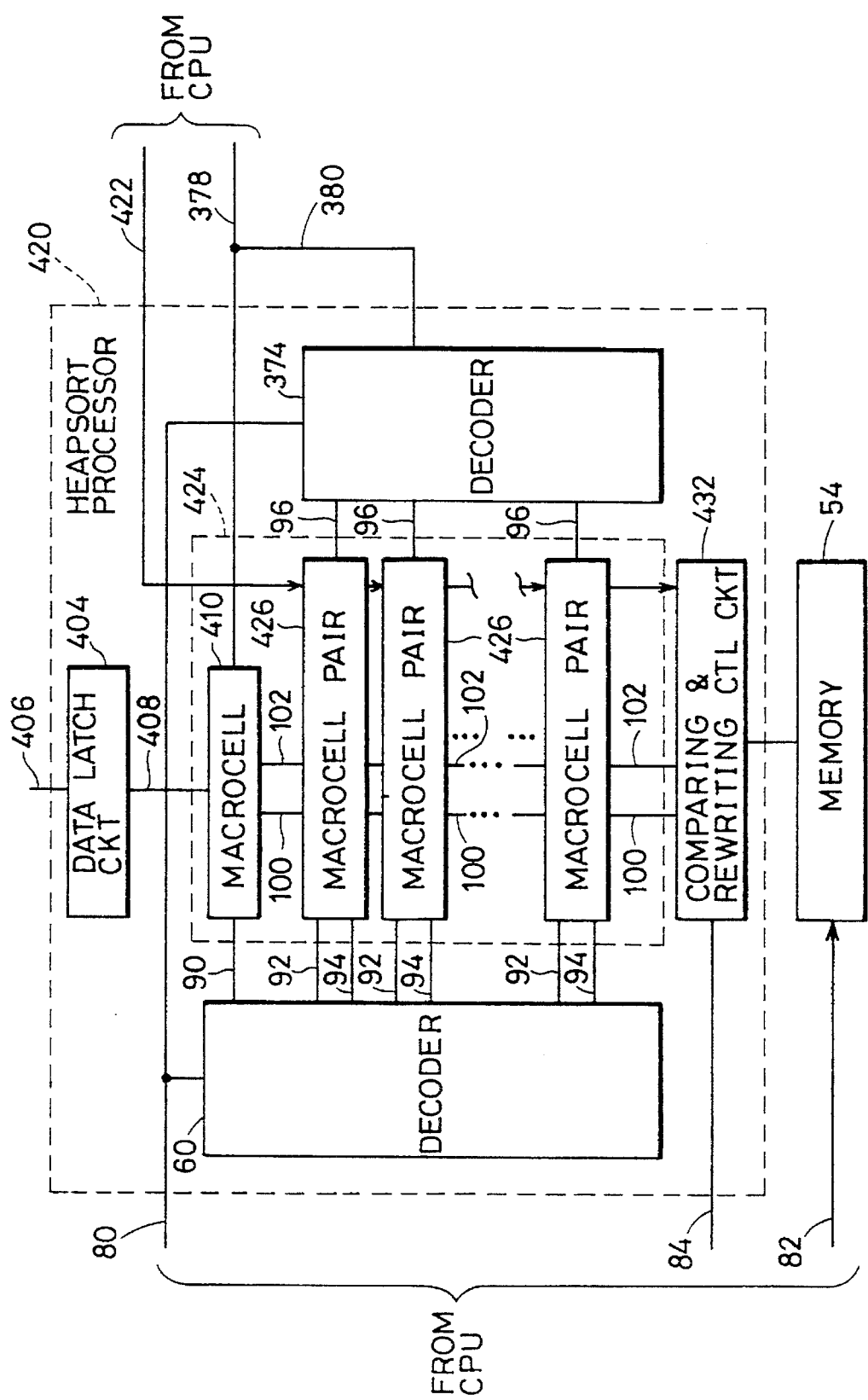
FIG. 30 is a block diagram of a heapsort processor of a fourth embodiment.

Referring to FIG. 30, the heapsort processor 420 of the fourth embodiment differs from heapsort processor 400 of the third embodiment shown in FIG. 29 in that it includes, instead of memory cell array 402 of FIG. 29, a memory cell array 424 to which an external sort mode signal line 422 is connected, and that it includes, instead of comparing and rewriting control circuit 66 of FIG. 29, a comparing and rewriting control circuit 432 connected to the sort mode signal line 422. In FIG. 30, portions corresponding to those of FIGS. 10, 27 and 29 are denoted by the same reference characters and these portions have similar functions. Therefore, detailed description thereof will not be repeated here.

Memory cell array 424 differs from memory cell array 402 (see FIG. 29) of the third embodiment in that instead of macro cell pair 72 of FIG. 29, it includes a plurality of macro cell pairs 426 which are connected to sort mode signal line 422. Connection between each macro cell pair 426 and decoders 60 and 374 is the same as the third embodiment shown in FIG. 29.

Figure 31:
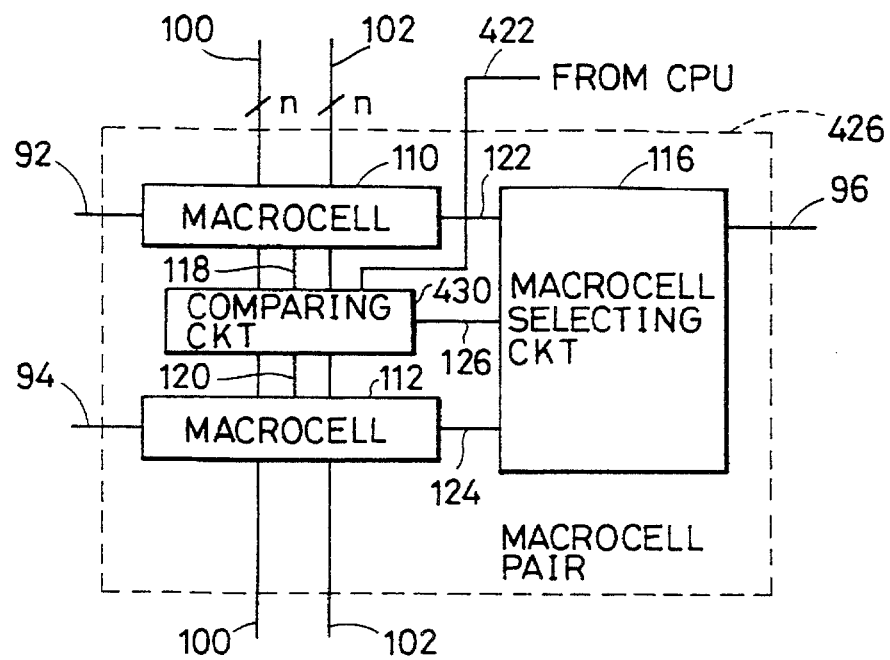
FIG. 31 is a block diagram of a macro cell pair.

FIG. 31 shows the structure of macro cell pair 426. Macro cell pair 426 differs from macro cell pair 72 shown in FIG. 11 only in that it includes, instead of comparing circuit 126 of FIG. 11, a comparing circuit 430 connected to sort mode signal line 422. In FIG. 31, portions similar to those of FIG. 11 are denoted by the same reference characters and they have similar functions.

Figure 32:
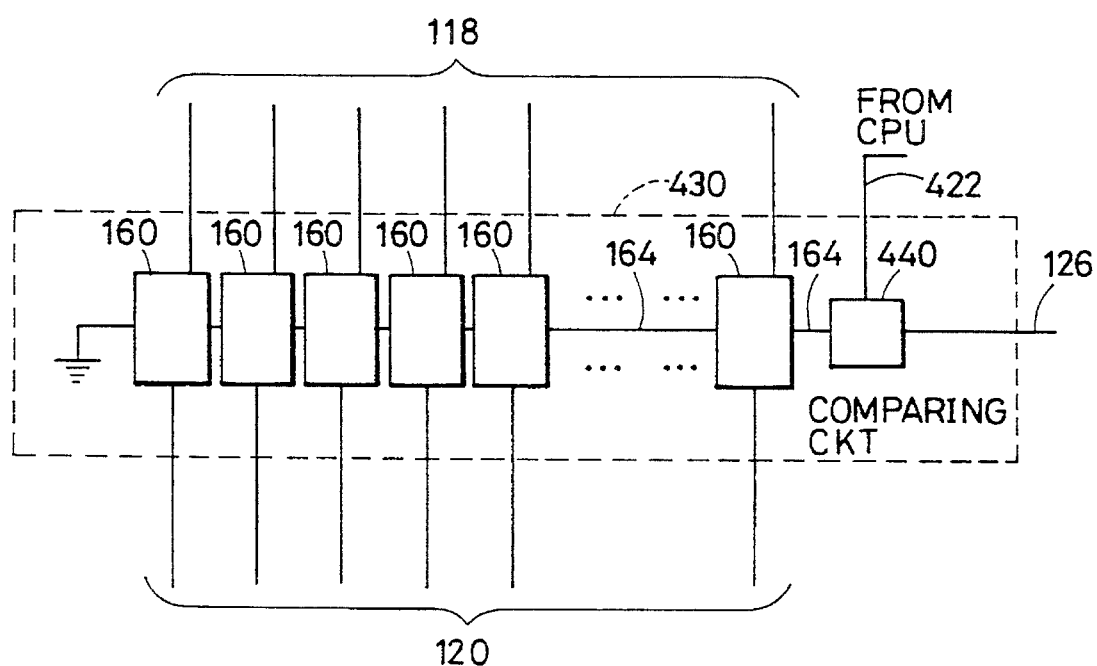
FIG. 32 is a block diagram of a comparing circuit.

FIG. 32 shows a structure of comparing circuit 430. Comparing circuit 430 shown in FIG. 32 is almost the same as comparing circuit 114 of the first embodiment shown in FIG. 16. However, instead of NOT circuit 162 of FIG. 16, it includes a circuit 440 connected to sort mode signal line 422 for converting or not converting signal level on line 164 based on the applied sort mode signal for providing the signal to comparison determination signal line 126. In FIGS. 32 and 16, the same portions are denoted by the same reference characters.

Figure 33:
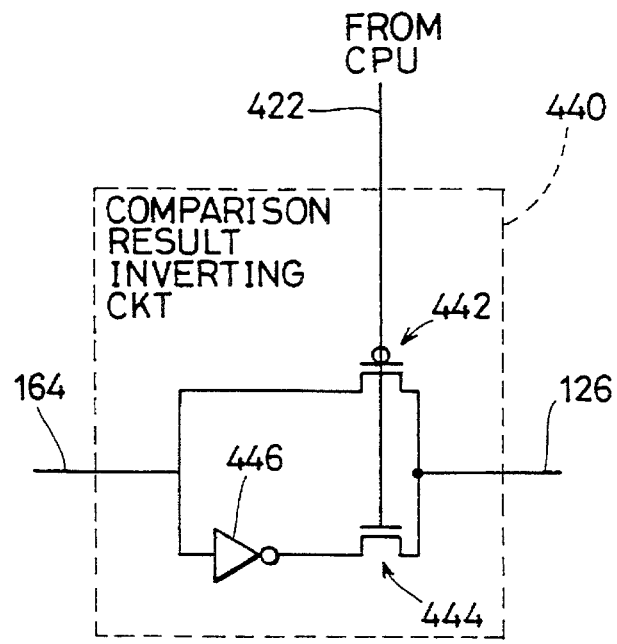
FIG. 33 is a schematic diagram of a comparison result inverting circuit.

Referring to FIG. 33, circuit 440 includes a p channel transistor 442, an n channel transistor 444 and a NOT circuit 446. Transistors 442 and 444 have their gate electrodes commonly connected to sort mode signal line 422. One of input/output terminals of each of transistors 442 and 444 is commonly connected to comparison determination signal line 126. The other input/output terminal of transistor 442 is connected to line 164. The other input/output terminal of transistor 444 is connected to line 164 through NOT circuit 446.

In the circuit 440 shown in FIG. 33, if the signal on sort mode signal line 422 is logic 1, the output of NOT circuit 446 is provided and if it is logic 0, the potential on line 164, as it is, is provided, to comparison determination signal line 126. If the sort mode signal is logic 1, the comparison determination signal would be the same as in Embodiments 1 to 3, and if sort mode signal is logic 0, the comparison determination signal would be reversed to that of Embodiments 1 to 3.

If the comparison determination signal is set reverse to that of Embodiments 1 to 3, of the two macro cells 110 and 112 included in this macro cell pair, one having smaller data is selected and connected to the second bit line 102. Therefore, by modifying the structure of comparing and rewriting control circuit 432 as will be described later, heap data structure satisfying the condition that the parent is smaller than its children, can be generated, and heapsorting of data in the descending order can be performed.

Figure 34:
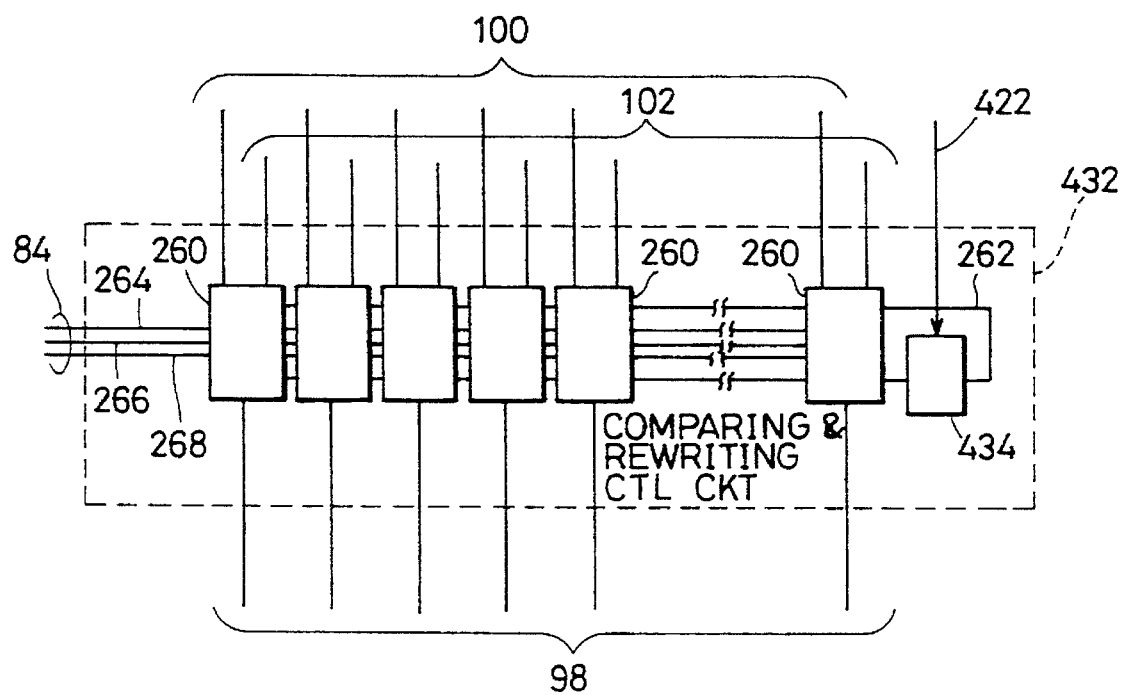
FIG. 34 is a block diagram of a comparing and rewriting control circuit.

Referring to FIG. 34, comparing and rewriting control circuit 430 is almost the same as comparing and rewriting control circuit 66 of the first embodiment shown in FIG. 21, except that it further includes a circuit 434 connected to sort mode signal line 422 for inverting or not inverting the level of data selection signal line 262 dependent on the sort mode signal. Circuit 434 can be implemented by an almost similar structure as that shown in FIG. 33, and details thereof will not be discussed here.

In the fourth embodiment, by setting the sort mode signal on sort mode signal line 422 to logic 1, the same operation as sort mode processor 400 of the third embodiment can be performed. By setting the sort mode signal to logic 0, it becomes possible to provide heap data structure satisfying the condition that the parent is smaller than its children, and to heapsort data in descending order. Details of operation of heapsort processor 420 in accordance with the fourth embodiment are almost the same as those of the third embodiment, so that details thereof will not be repeated here.

Fifth Embodiment

In the heapsort processor circuits of Embodiments 2 to 4, it has been necessary to apply address values for generating heap data from an external CPU at the time of heapsorting. The external CPU must constantly monitor the heapsort processor and to apply necessary data, and hence it cannot execute other processes until the completion of sorting. Further, if the external CPU is performing other process of higher priority, it may impossible to apply necessary data at appropriate time to the heapsort processor. In such a case, the heapsort processor must stop sorting operation.

In order to improve overall system performance including the heapsort processor, it is necessary to provide a heapsort processor capable of performing sorting with minimum control by the CPU. The fifth embodiment is directed to such a heapsort processor that can meet this demand for performing nearly automatic sorting.

Upon reviewing the above described heapsort algorithm, it may be noticed that after the heap data is generated at first, there is a step of repeatedly generating heap data during heapsorting. In this step of generating heap data, the data of interest except the root are already made heap. For this reason, there can be found a definite rule in the process for making such data fully heap again. If this rule could be found, heapsort can be automatically done by a hardware. The fifth embodiment starts from this point.

Before describing the fifth embodiment, the data which must be externally applied for performing heapsort will be discussed. The following two information may be included in such data.

(1) The number of data to be re-sorted into a heap state. This number is decremented one by one from the total number of data stored at first, every time the data is re-sorted into a heap state.

(2) Address value of node (parent data) of interest when heap data is to be generated. At the start of heap data generation, this is 1 (root), and after the exchange of data between parent and child starts, the address of the child of which data has been exchanged for the parent. This is twice or twice plus one the address value of the parent data immediately before, and it is also the address of the macro cell from which data is read to the second bit line 102 (see FIG. 10 etc.)

If these two data can be automatically generated, no other external data is necessary, except the total number of data stored at first. Further, in the process for generating heap data after the last of the data to be resorted has been exchanged for the root, the data is already made heap to some extent.

More specifically, every parent node except the root has larger value than either of the children nodes. Further, as a result of comparison between parent and children of interest, if the data of a child is larger, it is exchanged for the parent data without fail. Therefore, in the event that the parent data is not exchanged for the child data, it means that values of nodes above the parent's data of interest are all larger than the value of this parent, and the higher the node, the larger the value thereof. Further, if the parent's data is not exchanged for the child's data, it means that the parent of interest is larger than either of its children. Further, subtrees below respective children are already made heap.

Therefore, when the parent's data and children's data are not exchanged, the data as a whole of interest have already been made heap. Namely, the process for generating heap data may be completed, assuming that the heap state is completed at this time, to be ready for another process. More specifically, in that event, the signal on mode designating signal line 378 of Embodiment 2 (see FIG. 27) may be set to logic 1.

Figure 35:
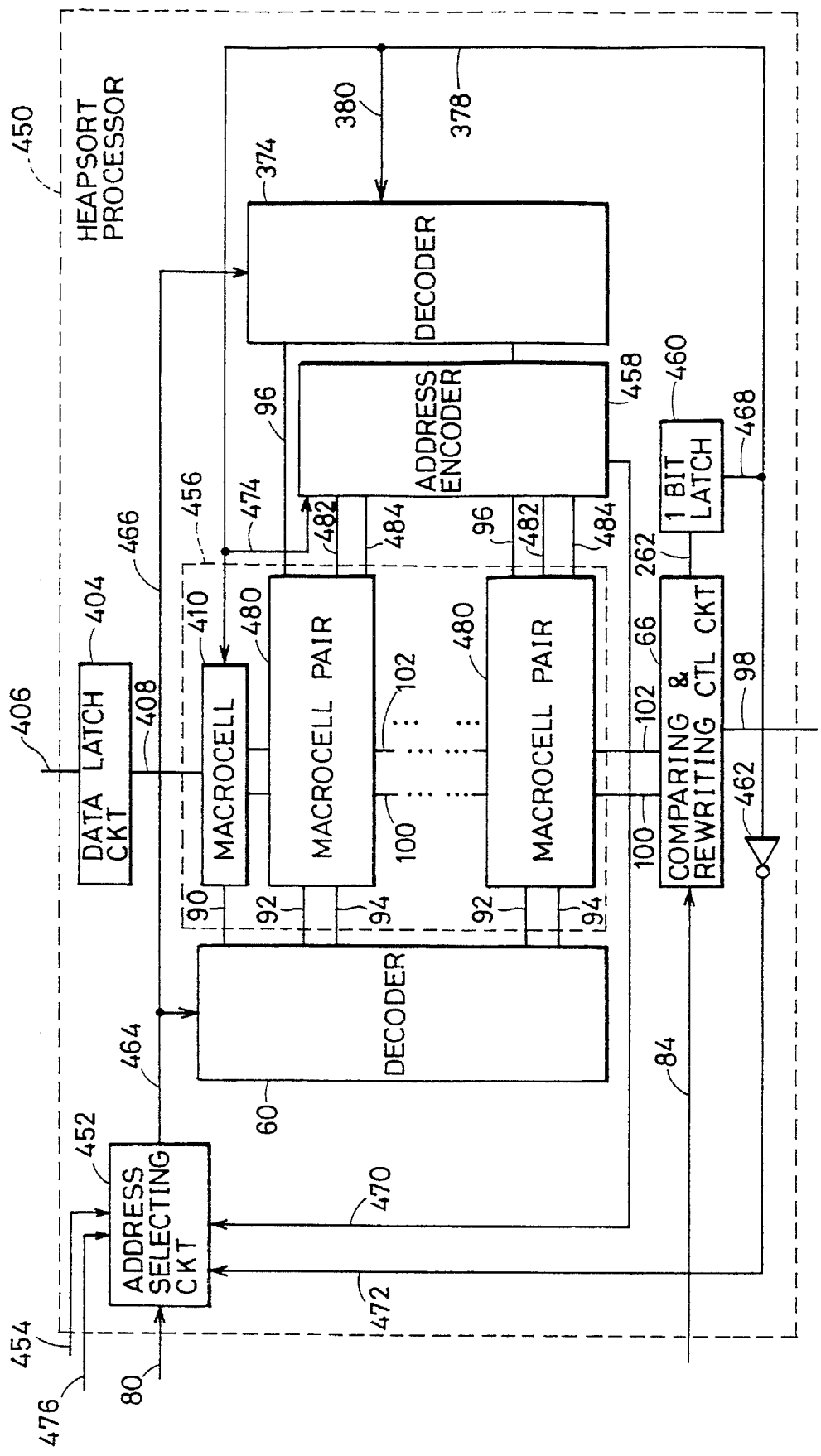
FIG. 35 is a block diagram of a heapsort processor of a fifth embodiment of the present invention.

In the fifth embodiment, the above described function is implemented by a hardware. Referring to FIG. 35, heapsort processor 450 of the fifth embodiment has basically the same structure as heapsort processor 400 of the third embodiment shown in FIG. 29. Heapsort processor 450 differs from heapsort processor 400 of FIG. 29 in that it includes an address selecting circuit 452 connected to address signal line 80, to sort execution signal line 454 and to external data line 476, and having a function of calculating an address of a macro cell corresponding to that node which is to be processed and providing the address to address signal line 464; a 1 bit latch circuit 460 connected to data selection signal line 262 (see FIG. 21) of comparing and rewriting control circuit 66 for latching and providing to a NEXT signal line 468, a data selection signals; a NOT circuit 462; and an address encoder 458. Further, heapsort processor 450 includes, instead of memory cell array 402 of the third embodiment shown in FIG. 29, a memory cell array 456 including a plurality of macro cell pairs 480.

In FIG. 35, portions corresponding to those of FIG. 29 are denoted by the same reference characters and referred to similarly, and they have similar functions. Therefore, details thereof will not be repeated here.

NOT circuit 462 has its input connected to NEXT signal line 468, and its output connected to address selection circuit 452 through NEXT signal line 472.

Mode designating signal line 378 is connected to NEXT signal line 468. Address encoder 458 is connected to mode designating signal line 378 through data line 474, and to each macro cell pair 480 by selection signal lines 482 and 484. Address encoder 458 encodes the address of a macro cell selected either by mode designating signal line 378 or address decode signal line 96 of decoder 374, for applying the encoded address to address selection circuit 452 through NEXT address data line 470. Address encoder 458 has reverse function to that of decoder 60, and it is provided for calculating address value of the macro cell from the selection signal applied from the selected macro cell.

Figure 36:
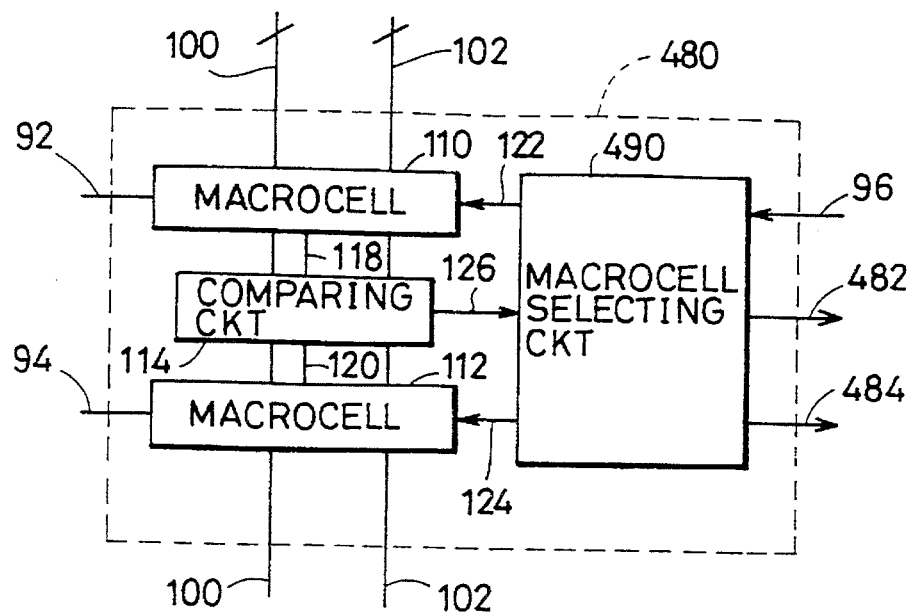
FIG. 36 is a block diagram of a macro cell pair.

Referring to FIG. 36, macro cell pair 480 includes macro cells 110 and 112, a comparing circuit 114, and a macro cell selecting circuit 490. In FIG. 36, portions corresponding to those of FIG. 11 are denoted by the same reference characters and referred to similarly. They have similar functions.

Similar to macro cell selection circuit 116 of FIG. 11, macro cell selecting circuit 490 is connected to decoder 374 (FIG. 34) through address decode signal line 96, to macro cells 110 and 112 through selection signal lines 122 and 124, and to comparing circuit 114 through comparison determination signal line 126, respectively. Macro cell selecting circuit 490 is further connected to address encoder 458 (FIG. 35) through selection signal lines 482 and 484.

Figure 37:
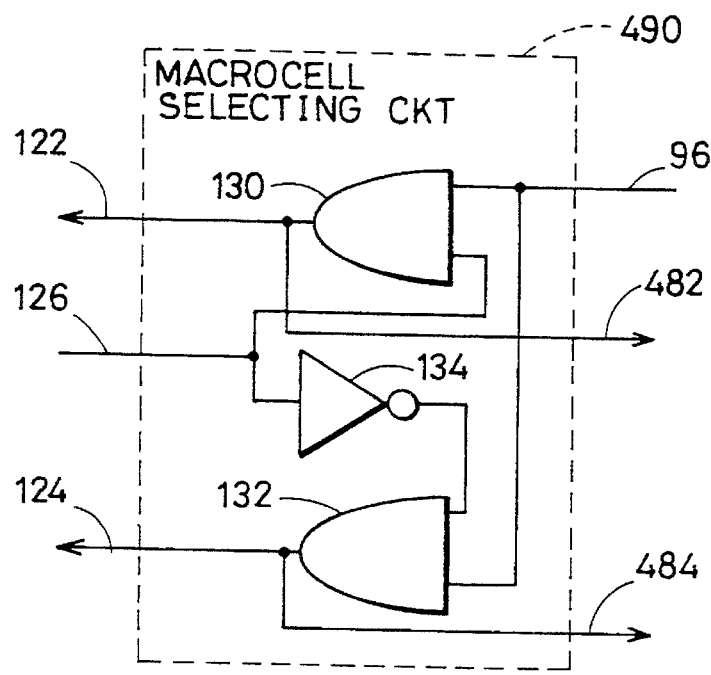
FIG. 37 is a block diagram of a macro cell selecting circuit.

Referring to FIG. 37, macro cell selecting circuit 490 has approximately the same structure as the first macro cell selecting circuit 116 shown in FIG. 12. However, the macro cell selecting circuit 490 is adapted to apply the output from AND circuit 132 through selection signal line 482, and output of AND circuit 132 through selection signal 484, to address encoder 458.

Referring to FIG. 38, address selecting circuit 452 includes a decrement circuit 500, p channel transistors 502 and 506, and n channel transistors 504 and 508.

Decrement circuit 500 is connected to external data line 476 and to NEXT signal line 472. Decrement circuit 500 stores data (number of data to be sorted) applied externally through external data line 476, and provides the value by decrementing by one, every time the signal on NEXT signal line 471 changes from logic 0 to logic 1.

Gate electrodes of p channel transistor 502 and n channel transistor 504 are commonly connected to NEXT signal line 472. One of the input/output terminals of each of p channel transistor 502 and n channel transistor 504 is commonly connected to one input/output terminal of n channel transistor 508. The other input/output terminal of p channel transistor 502 is connected to the output of decrement circuit 500. The other input/output terminal of n channel transistor 504 is connected to NEXT address data line 470. When the signal on NEXT signal line 472 is logic 1, p channel transistor 502 and n channel transistor 504 select and provide the data on NEXT address data line 470, and if it is logic 0, select and provide the output of decrement circuit 500, to n channel transistor 508.

The gate electrodes of p channel transistor 506 and n channel transistor 508 are commonly connected to sort execution signal line 454. One input/output terminal of each of p channel transistor 506 and n channel transistor 508 is commonly connected to address signal line 464. The other input/output terminal of p channel transistor 506 is connected to address signal line 80. When the signal on sort execution signal line 454 is logic 1, p channel transistor 506 and n channel transistor 508 select and provide the output from p channel transistor 502 or n channel transistor 504, and if it is logic 0, select and provide data on address signal line 80, to address signal line 464. It should be noted that only a signal of 1 bit of address selecting circuit 452 is shown in FIG. 38.

In summary, address selecting circuit 452 operates in the following manner.

(1) If sort execution signal 454 is logic 0, it selects an external address data applied through address signal line 80 as an input to heapsort processor 450.

(2) When sort execution signal 454 is logic 1 and the NEXT signal on NEXT signal line 472 is logic 1, it selects the NEXT address data on NEXT address data line 470 as an input to heapsort processor 450.

(3) When sort execution signal 454 is logic 1 and the NEXT signal on NEXT signal line 472 is logic 0, it selects the data provided from decrement circuit 500 as an input to heapsort processor 450.

The heapsort processor 450 of the fifth embodiment operates in the following manner.

(S1) At first, heap data is generated. This process is the same as the embodiments described above. At this time, the signal on sort execution signal line 454 shown in FIG. 38 is set to logic 0. Addresses of respective macro cells are successively applied from the CPU to address signal line 80, and the data are stored in macro cells.

In 1 bit latch circuit 460 shown in FIG. 35, logic 0 is stored in the initial state. Decoder 380 is enabled. Therefore, by applying an address signal for selecting a macro cell in accordance with a series of algorithm for generating heap data described above from the external CPU through address signal line 80, heap data are generated in memory cell 456. Up to this step, the operation is controlled by the external CPU.

(S2) After the generation of heap data, the number of data to be sorted is stored in decrement circuit 500 of FIG. 38, through external data 476. The number of data is represented, for example, by n.

(S3) For performing sorting, the sort execution signal on sort execution signal line 454 is set to logic 1. The process up to here is controlled by external circuits.

(S4) As already described, immediately before the start of sorting, rewriting of data does not take place, and logic 1 is stored in latch circuit 460. Since the signal on NEXT signal line 472 of FIG. 38 attains to logic 0, transistor 502 turns on and transistor 504 turns off. Since the transistor 508 is on, the output data of decrement circuit 500 (that is, n) is provided on address signal line 464. This address data is applied to decoder 60 of FIG. 35, and most significant 2 bits thereof are applied to decoder 374.

Decoder 60 decodes the address signal and selects the nth macro cell. Therefore, the data of the nth macro cell is read to the first bit line 100.

Since the mode designating signal on mode designating signal line 378 is logic 1, decoder 380 is disabled and macro cell 410 is selected. Data stored in macro cell 410 is read to second bit line 102. Of the signals applied to address encoder 458, only that one which comes from data line 474 assumes the value indicating that it is selected. Therefore, the output of address encoder 458 attains to "1". This address data is applied to address selection circuit 452 through NEXT address data line 470.

(S5) Heap data have been already generated in memory cell 456. Therefore, between macro cell 410 and the nth macro cell selected by decoder 60, data are exchanged. The signal of logic 0 is provided to data selection signal line 262.

This signal of logic 0 is latched in 1 bit latch circuit 460. The signal on NEXT signal line 472 attains logic 1. Referring to FIG. 38, in address selecting circuit 452, transistor 502 turns off while transistor 504 turns on. At this time, the data of decrement circuit 500 is decremented by one, in response to the change of the signal on NEXT signal line 472 from logic 0 to logic 1. Address selecting circuit 452 selects data on NEXT address data line 470, and provides the same to address signal line 464.

Since data on NEXT address data line 470 is "1" as mentioned above, decoder 60 shown in FIG. 35 selects the first macro cell 410. The macro cell 410 is connected to first bit line 100.

Referring to FIG. 35, the signal on mode designating signal line 378 is logic 0. Decoder 374 decodes 2 bits of data applied from address selecting circuit 452 through address signal lines 464 and 466, and selects a corresponding macro cell pair 480. At this time, since "1" is applied as the address, decoder 374 selects the macro cell 480 which includes the second and third macro cells.

Referring to FIG. 36, in the selected macro cell pair 480, comparing circuit 114 has already been comparing data stored in macro cells 110 and 112 and applying the comparison determination signal through comparison determination signal line 126 to macro cell selecting circuit 490. When data of macro cell 110 is larger than the data of macro cell 112, the comparison determination signal assumes logic 1.

Referring to FIG. 37, when the signal on comparison determination signal line 126 is logic 1, the signal on selection signal line 122 attains to the high level, and selection signal line 482 attains to the high level. Meanwhile, if the comparison determination signal is logic 0, the signals on selection signal lines 124 and 484 attain high level. The macro cell, to which the high level selection signal is applied, is connected to the second bit line 102.

The output of latch circuit 460 shown in FIG. 35 is logic 0, as mentioned above. Therefore, decoder 374 has been enabled, and heapsort processor 450 performs the operation of generating heap data, which operation is similar to that of the heapsort processor 370 of the second embodiment shown in FIG. 27 when the signal on mode designating signal line 378 assumes logic 0.

Here, the data in memory cell array 456 has been once made heap as already described. However, the content of the macro cell corresponding to the root and the content of the nth macro cell have been exchanged. Therefore, if exchange of data between parent and child takes place in the subsequent process for generating heap data, the address of the child which has been exchanged for the parent, may be directly applied to decoder 60 as the address of the parent data to be processed next time.

More specifically, an address of macro cell 110 or 112 selected by decoder 374 and by comparing circuit 114 and macro cell selecting circuit 490 in macro cell pair 480 may be encoded by address encoder 458 and applied to first decoder 60 through address selecting circuit 452. Referring to FIG. 38, as the signal on NEXT data line 472 is logic 1 as described above, the data on NEXT address data 470 is output from address selecting circuit 452 to address signal line 464.

(S6) The operation of step S5 is repeated until no exchange of data takes place. As long as the data of parent and child are exchanged, the signal of logic 0 is provided to data selection signal line 262, and the output of latch circuit 460 is kept logic 0.

When data of the parent and child are not exchanged, the signal provided from comparing and rewriting control circuit 66 to data selection signal line 262 assumes logic 1. Latch circuit 460 latches this signal of logic 1, and applies the same to macro cell 410, address encoder 458 and decoder 374. The output from latch circuit 460 is also inverted by NOT circuit 462 and applied to address selecting circuit 452. The fact that exchange of data between the parent and child stops means that the data in memory cell array 456 is again made heap, as already described.

(S7) Since the signal on NEXT signal line 472 is set to logic 0 and the signal on mode designating signal line 378 is set to logic 1 respectively, the process return to the state of step S4 described above, and the process following step S4 are repeated. However, at this time, the data of decrement circuit 500 shown in FIG. 38 is decremented by one in step S5. Therefore, the address signal applied from address selecting circuit 452 in the next step S4 would be "n−1".

By repeating the processes from steps S4 to S6, heapsort is performed. In this embodiment, every time the mode designating signal line 378 assumes logic 1, the content of macro cell 410 is copied in data latch circuit 404, and the copied value is maintained until the mode designating signal next assumes logic 1. Therefore, by reading data through data output line 406 from data latch circuit 404 while heap data is being generated in heapsort processor 450, the result during sorting can be obtained in ascending order. By the completion of heapsorting, the smallest data would have been stored in macro cell 410, and therefore when this data is read, all the results of the heapsorting can be obtained almost simultaneously with the completion of heapsort.

According to the heapsort processor 450 of the fifth embodiment, the mode designating signal on mode designating signal line 378 and the address signal to be applied to decoder 60 at the time of heapsort generation during heapsorting of FIG. 35 can be automatically generated by comparing and rewriting control circuit 66 and 1 bit latch circuit 460, and by address encoder 458 and address selecting circuit 452, respectively. After the start of heapsorting, it is not necessary for the external CPU to control heapsort processor 450, and the heapsorting can be automatically executed.

Sixth Embodiment

In the above described embodiment, if the number of macro cells in the memory cell array is n, it is impossible to make heap larger number of data than n. Therefore, naturally, heapsort is impossible. In other words, there is a limit in the number of data which can be sorted.

It may be possible to manufacture an integrated circuit capable of storing a large amount of data, if the manufacturing technique of semiconductor devices improves. However, a processor circuit capable of satisfactorily large number of data cannot be obtained by the integrated circuit technique at present. Even if the manufacturing technique improves, there would still be the limit in the number of data which can be stored in one processor. Therefore, it is desired to provide a processor circuit in which the number of data which can be sorted is not limited by the manufacturing technique of the semiconductor circuit.

The sixth embodiment relates to a processor circuit which can implement such a system. In this embodiment, each processor circuit is implemented in an LSI. By connecting a plurality of such processor circuits, it becomes possible at least theoretically, to make heap unlimited number of data and to perform heapsort regardless of the manufacturing technique of each of the LSI.

Referring to FIG. 39, the heapsort processor system 520 in accordance with the sixth embodiment includes a plurality of heapsort unit LSIs 526, predecoders 522 and 524, comparing and rewriting control circuit 66, and macro cell 70. In FIG. 39, portions corresponding to those shown in FIG. 10 are denoted by the same reference characters and referred to similarly, and detailed description thereof will not be repeated here.

However, it should be noted that though the parts are denoted by the same reference characters, each part has different number of bits than those shown in FIG. 10. The larger the amount of data to be processed, the larger the number of bits required for designating the address. Therefore, each part of the embodiment shown in FIG. 39 generally has larger number of bits than the corresponding part of the embodiments described above. For example, the address signal applied through address signal line 80 consists of 32 bits.

Predecoder 522 decodes most significant several bits of the address signal applied through address signal line 80, and applies an address enable signal through address enable signal line 532 to one of the LSIs 526.

When the signal on mode designating signal line 378 is logic 1, predecoder 524 is disabled, and it is enabled when the signal is logic 0. When enabled, predecoder 524 decodes part of the address signal data multiplied by two, applied from address signal line 80 in the similar manner as predecoder 522, and provides an address enable signal to address enable signal line 534.

Macro cell 70 is the same as that of the first embodiment. In this example, when the data applied to predecoder 522 is "1", macro cell 70 is selected and connected to the first bit line 100, and when the signal on mode designating signal line 378 is logic 1, it is similarly selected and connected to the second bit line 102.

Of address data line 80, the remaining address signal which was not applied to predecoder 522 is branched to address signal line 528 and connected to each LSI 526. Twice the data of address signal line 528 are applied to each LSI 526 through address signal line 530.

Figure 40:
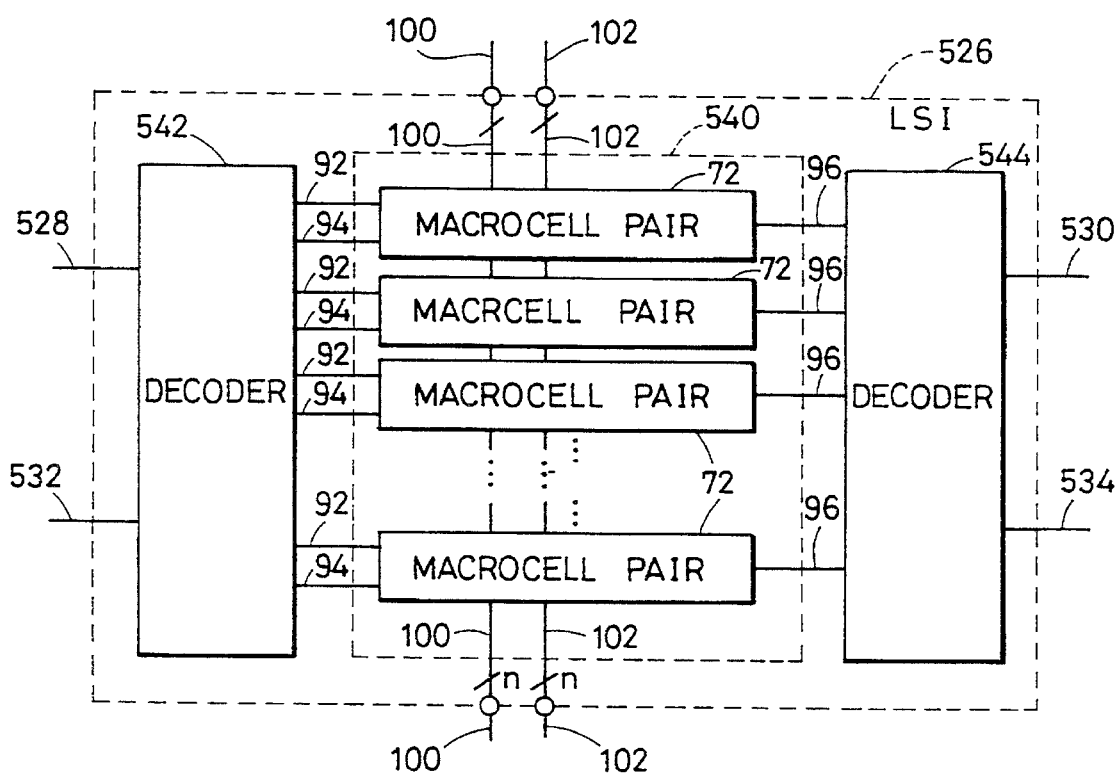
FIG. 40 is a block diagram of a unit LSI for heapsort.

Referring to FIG. 40, LSI 526 includes a memory cell array 540 including a plurality of macro cell pairs 72, and decoders 542 and 544. Each macro cell pair 72 can be connected to the first bit line 100 and second bit line 102.

Decoder 542 is connected to address signal line 528 and to address enable signal line 532. When address enable signal is not applied, decoder 542 does not select any macro cell. When address enable signal is applied, decoder 542 decodes an address signal applied from address signal line 528, and provides a selection signal to only one of selection signal lines 92 and 94 for selecting the corresponding macro cell.

Decoder 544 is connected to address signal line 530 and address enable signal line 534. When address enable signal is not applied, decoder 544 does not select any of the macro cell pair 72. When address enable signal is applied, decoder 544 decodes the address signal applied through address signal line 530, and provides an address decode signal to only one of address decode signal lines 96 so as to select the corresponding macro cell pair 72.

Macro cell pair 72 has identical structure as macro cell pair 72 shown in FIG. 11, for example. Therefore, when a certain macro cell pair 72 is selected, one storing larger data is selected from the two macro cells included in the macro cell pair, and is connected to the second bit line 102.

Heapsort processor system 520 of this embodiment operates in the following manner. In the following description, it is assumed that each LSI 526 is capable of storing $2^{25}$ data. The data can be addressed by an address signal of 25 bits.

When $2^{32}$ data are to be sorted, it is necessary to connect $2^7$ (128) LSIs 526 by bit lines 100 and 102. Of the 32 bits of address signal externally applied through address signal line 80 of FIG. 39, upper 7 bits are applied to predecoder 522 and remaining 25 bits are applied to all the LSIs 526. Therefore, only that macro cell selected by address signal 528 which is in only one LSI 526 selected by predecoder 522 is connected to the first bit line 100.

Predecoder 524 selects only that LSI 526 in which the macro cell pair including a macro cell of twice or twice plus one address of that macro cell selected by predecoder 522 and by address signal line 528. In the selected macro cell pair, the macro cell storing larger data is connected to the second bit line 102.

The operation of heapsort processor system 520 thereafter is the same as that of heapsort processor 370 of the second embodiment shown in FIG. 11. By setting the signal on mode designating signal 378 to logic 0 or logic 1, it is possible to perform heap data generation or heapsorting, similar to the second embodiment. In the heapsort processor system, when the mode designating signal on mode designating signal line 378 is logic 1, predecoder 524 is disabled, so that LSIs 526 are not selected, and the first macro cell 70 (FIG. 39) is connected to the second bit line 102. The operation in this case is also the same as the second embodiment.

As described above, in the heapsort processor system in accordance with the sixth embodiment, by decoding the input address data, similar processes as in the heapsort processors of Embodiments 2 to 5 can be performed. No matter how large the number of data should be processed, the data can be sorted to a heap state, and the data can be heapsorted, by increasing the number of unit LSIs 536.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A heapsort processor circuit, comprising:

a memory cell array including a plurality of macro cells;

a plurality of bit lines, and a plurality of first and second selection lines intersecting the plurality of macro cells;

a first decoder connected to the plurality of first selection lines for selecting a first macro cell of said memory cell array in response to an address signal provided external to said heapsort processor circuit;

a memory provided external to said heapsort processor for inputting data to and receiving data from a macro cell via said plurality of bit lines at an address selected by said first decoder;

a second decoder connected to said plurality of second selection lines and responsive to said address signal at the same time as said first decoder responds to said address signal for providing a designating signal designating two macro cells of two addresses having a prescribed relation with the address of said first macro cell;

a plurality of selecting circuits each provided for two macro cells, a respective selecting circuit responsive to said designating signal for selecting, from the two macro cells corresponding to said respective selecting circuit, a second macro cell satisfying a predetermined condition; and a comparing and rewriting control circuit for comparing data of said first macro cell and the data of said second macro cell, detecting the data of said first macro cell not satisfying said predetermined condition with respect to the data of said second macro cell, and exchanging the data of said first macro cell and said second macro cell in response to said detecting.

2. The processor circuit according to claim 1, wherein said prescribed relation is to satisfy either it is equal to twice the address of said first macro cell or it is equal to twice plus one the address of said first macro cell.

3. The processor circuit according to claim 2, wherein said predetermined condition is that it stores a larger value than another macro cell.

4. The processor circuit according to claim 1, further comprising means for detecting an address signal applied to said first decoder in a certain operation cycle satisfying said prescribed relation with respect to an address signal applied to said first decoder in an immediately succeeding operation cycle, for generating a signal for inhibiting operation of said immediately succeeding operation cycle.

5. The processor circuit according to claim 1, further comprising fourth selecting means responsive to a first value of an operational mode setting signal for enabling said second decoder, and responsive to a second value of said operational mode setting signal, for disabling said second decoder and for selecting a macro cell of a first address of said memory cell array as said second macro cell.

6. The processor circuit according to claim 5, further comprising means for reading content of the macro cell of the first address of said memory cell array.

7. The processor circuit according to claim 6, wherein said first decoder includes means for comparing contents of said two macro cells selected by said second decoder, selecting a predetermined first condition or a second condition which is negation of said first condition, based on a sort mode setting signal, and for selecting a macro cell satisfying the selected condition as said second macro cell; and said exchanging means includes means for comparing the content of said first macro cell and the content of said second macro cell, selecting said first condition or said second condition based on said sort mode setting signal, detecting the content of said first macro cell not satisfying selected said condition with respect to the content of said second macro cell, for exchanging the content of said first macro cell and content of said second macro cell.

8. The processor circuit according to claim 7, further comprising means for reading content of the macro cell of the first address of said memory cell array.

9. The processor circuit according to claim 5, further comprising:

means for detecting whether exchange between the content of said first macro cell and the content of said second macro cell is performed by said exchanging means and for generating an exchange detection signal; and operational mode setting means for selectively setting said operational mode setting signal to said first or second value.

10. The processor circuit according to claim 9, further comprising:

means for detecting an address of said second macro cell and for outputting a selected address signal; and address selecting means responsive to said exchange detection signal assuming a value indicative of detection of said exchange, for applying the address specified by said selected address signal to said first decoder.

11. The processor circuit according to claim 10, wherein said address selecting means includes storing means for storing and outputting an externally applied initial data;

decrementing means responsive to a change of said exchange detection signal from a value indicative of non-occurrence of said exchange to a value indicative of occurrence of said exchange, for decrementing the data stored in said storing means by a predetermined value, and means for selectively applying to said first selecting means, said selected address signal or an output from said decrementing means, based on the value of said exchange detection signal.

12. A heapsort processor circuit, comprising:

a memory cell array including a plurality of macro cells;

a first decoder enabled by a first address enable signal and responsive to a first address signal for selecting an arbitrarily first macro cell of said memory cell array;

a second decoder enabled by a second address enable signal and responsive to a second address signal, related to said first address signal, at the same time as said first decoder responds to said first address signal, for selecting two macro cells of two addresses having prescribed relation with said first address signal;

selecting means for comparing contents of said two macro cells selected by said second decoder and for selecting from said two macro cells, a second macro cell satisfying a predetermined condition;

a first data line which can be connected to said plurality of macro cells and an external circuit, and selectively connected to a macro cell of an address selected by said first decoder; and a second data line which can be connected to said plurality of macro cells and to an external circuit, and selectively connected to a macro cell of an address elected by said selecting means.

13. The processor circuit according to claim 12, wherein said prescribed relation is either it is equal to twice the address of said first macro cell or it is equal to twice plus one the address of said first macro cell.

14. The processor circuit according to claim 13, wherein said predetermined condition is that it stores a larger value than another macro cell.

15. A memory circuit comprising:

a memory cell array including a plurality of macro cells;

first decoder responsive to an address signal for selecting an arbitrary first macro cell of said memory cell array; and a second decoder responsive to said address signal at the same time as said first decoder responds to said address signal, for selecting a pair of macro cells located at adjacent two addresses beginning at an address (2x) which is twice the address (x) of said first macro cell.

16. A method of heapsorting data stored in a memory circuit having a memory cell array including a plurality of macro cells, a first decoder, a second decoder, and selecting means for comparing contents of two macro cells selected by said second decoder, said method comprising:

providing a first address enable signal for enabling said first decoder and a second address enable signal for enabling said second decoder;

in response to a first address signal, selecting an arbitrarily first macro cell of said memory cell array with said first decoder;

in response to a second address signal and at the same time as said first decoder responds to said first address signal, selecting two macro cells of two addresses having a prescribed relation with said first address signal with said second decoder; and comparing contents of said two macro cells selected by said second decoder with said selecting means and selecting from said two macro cells, a second macro cell satisfying a predetermined condition.

* * * * *